United States Patent
Abeywardena et al.

(10) Patent No.: US 10,387,727 B2
(45) Date of Patent: Aug. 20, 2019

(54) BACKUP NAVIGATION SYSTEM FOR UNMANNED AERIAL VEHICLES

(71) Applicant: Wing Aviation LLC, Mountain View, CA (US)

(72) Inventors: Dinuka Abeywardena, Mountain View, CA (US); Damien Jourdan, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 15/703,948

(22) Filed: Sep. 13, 2017

(65) Prior Publication Data
US 2019/0080142 A1    Mar. 14, 2019

(51) Int. Cl.
*G06K 9/00* (2006.01)
*G05D 1/10* (2006.01)
(Continued)

(52) U.S. Cl.
CPC ........... *G06K 9/0063* (2013.01); *B64D 47/08* (2013.01); *G01C 11/06* (2013.01); *G01C 21/32* (2013.01);
(Continued)

(58) Field of Classification Search
USPC ......................................................... 382/181
See application file for complete search history.

(56) References Cited

U.S. PATENT DOCUMENTS

| 4,667,196 A | * | 5/1987 | Kaul | ..................... G01S 13/787 340/948 |
| 4,940,925 A | * | 7/1990 | Wand | .................. G05D 1/0246 318/580 |

(Continued)

FOREIGN PATENT DOCUMENTS

WO    2017/096548    6/2017

OTHER PUBLICATIONS

International Searching Authority, International Search Report and Written Opinion dated Mar. 11, 2019, issued in connection with International Patent Application No. PCT/US2018/050189, filed on Sep. 10, 2018, 25 pages.
(Continued)

*Primary Examiner* — Jerome Grant, II
(74) *Attorney, Agent, or Firm* — McDonnell Boehnen Hulbert & Berghoff LLP

(57) ABSTRACT

Described is a method that involves operating an unmanned aerial vehicle (UAV) to begin a flight, where the UAV relies on a navigation system to navigate to a destination. During the flight, the method involves operating a camera to capture images of the UAV's environment, and analyzing the images to detect features in the environment. The method also involves establishing a correlation between features detected in different images, and using location information from the navigation system to localize a feature detected in different images. Further, the method involves generating a flight log that includes the localized feature. Also, the method involves detecting a failure involving the navigation system, and
(Continued)

responsively operating the camera to capture a post-failure image. The method also involves identifying one or more features in the post-failure image, and determining a location of the UAV based on a relationship between an identified feature and a localized feature.

16 Claims, 18 Drawing Sheets

(51) Int. Cl.
    *B64D 47/08*     (2006.01)
    *G01C 11/06*     (2006.01)
    *G01C 21/32*     (2006.01)

(52) U.S. Cl.
    CPC ........ *G05D 1/101* (2013.01); *B64C 2201/028* (2013.01); *B64C 2201/123* (2013.01); *B64C 2201/127* (2013.01); *B64C 2201/141* (2013.01); *B64C 2201/146* (2013.01)

(56) References Cited

U.S. PATENT DOCUMENTS

| | | | | |
|---|---|---|---|---|
| 4,988,058 A * | 1/1991 | Dirscherl | ............... | F41G 7/303 244/3.16 |
| 5,243,524 A * | 9/1993 | Ishida | ................. | G05D 1/0212 180/169 |
| 5,260,709 A * | 11/1993 | Nowakowski | .......... | F41G 7/007 244/3.2 |
| 7,725,257 B2 | 5/2010 | Strelow et al. | | |
| 8,315,794 B1 | 11/2012 | Strelow et al. | | |
| 8,666,661 B2 | 3/2014 | Higgins | | |
| 9,551,990 B2 | 1/2017 | Heinonen | | |
| 2003/0025034 A1* | 2/2003 | Akahori | .................... | B64B 1/06 244/96 |
| 2013/0325316 A1* | 12/2013 | Vos | ........................ | G01C 17/34 701/408 |
| 2015/0073705 A1* | 3/2015 | Hiwatashi | ............... | G01S 19/48 701/468 |
| 2017/0031355 A1* | 2/2017 | Jung | ...................... | H04N 7/183 |
| 2017/0057634 A1* | 3/2017 | Hunt | ..................... | B64C 39/024 |
| 2017/0348061 A1* | 12/2017 | Joshi | .................. | A61B 17/7089 |
| 2018/0283872 A1* | 10/2018 | Robinson | ............... | G06Q 10/08 |
| 2018/0305012 A1* | 10/2018 | Ichihara | ................ | B64C 13/18 |

OTHER PUBLICATIONS

Suzuki et al., "Development of a SIFT based monocular EKF-SLAM algorithm for a small unmanned aerial vehicle," Proceedings of SICE Annual Conference, Sep. 13, 2011, pp. 1656-1659 (Abstract).

* cited by examiner

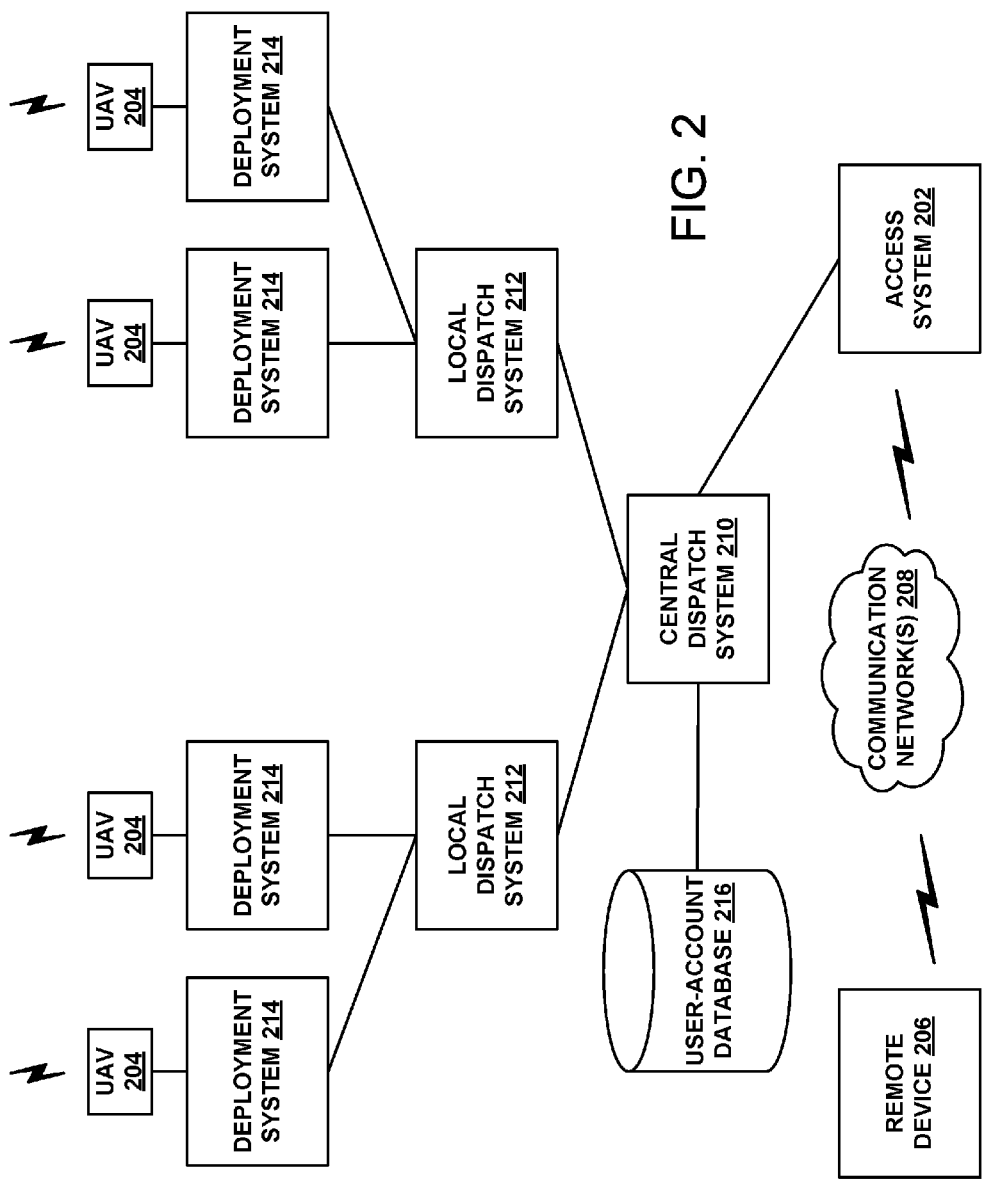

BACKUP NAVIGATION SYSTEM FOR UNMANNED AERIAL VEHICLES

BACKGROUND

An unmanned aerial vehicle ("UAV"), which may also be referred to as an autonomous vehicle, is a vehicle capable of travel without a physically-present human operator. A UAV may operate in a remote-control mode, in an autonomous mode, or in a partially autonomous mode.

When a UAV operates in a remote-control mode, a pilot or driver that is at a remote location can control the UAV via commands that are sent to the UAV via a wireless link. When the UAV operates in autonomous mode, the UAV typically moves based on pre-programmed navigation waypoints, dynamic automation systems, or a combination of these. Further, some UAVs can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of UAVs exist for various different environments. For instance, UAVs exist for operation in the air. Examples include quad-copters and tail-sitter UAVs, among others. UAVs also exist for hybrid operations in which multi-environment operation is possible.

SUMMARY

In practice, unmanned aerial vehicles (UAVs) include a primary navigation system that can help navigate the UAV to a desired destination. For various reasons, however, the primary navigation system can encounter a failure event that can render the primary navigation system inoperable. If a failure event occurs during the flight, undesirable results can take place, such as the UAV crashing. Accordingly, it is desirable to equip the UAV with a backup navigation system that can replace at least some of the navigational functionality of the primary navigation system in the case of a failure event, or that can be used to cross-check the integrity of the primary navigation system to protect it against malicious attacks or hazardous and misleading information (HMI). Disclosed herein is a backup navigation system that can generate and/or update a backup map of the UAV's flight path to a destination based on environmental imagery captured by the UAV as the flight progresses, such that this map can be utilized to provide continued navigation to the UAV so it can safely complete its mission or execute a landing at a safe landing zone (e.g., home base) in the event that the primary navigation system fails.

In one aspect, a method is provided. The method can involve operating an unmanned aerial vehicle (UAV) to begin a flight along a first flight path to a destination, where the UAV uses a primary navigation system to navigate to the destination. The method can also involve operating an image capture device coupled to the UAV and having a field-of-view (FOV) of an environment of the UAV to capture a first set of images as the UAV travels along the first flight path. The method can also involve analyzing the images to localize visual features within the environment, and generating a local flight log for the first flight path, which comprises location information and image data for the detected features. Further, the method can involve detecting a failure event involving the primary navigation system and responsive to detecting the failure event, capturing at least one post-failure image using the image capture device. Yet further the method can involve identifying, in the at least one post-failure image, one or more visual features within the environment, and determining a current location of the UAV by determining a current location of the UAV by determining a relationship between a first identified visual feature and a first localized visual feature.

In another aspect, an unmanned aerial vehicle is provided. The unmanned aerial vehicle (UAV) can include a primary navigation system that provides the UAV with navigational functionality and a backup navigation system configured to replace the navigational functionality of the primary navigation system upon detecting a failure event involving the primary navigation system. In particular, the backup navigation system can include an image capture device configured to capture images of an environment of the UAV. Further, the UAV can include a controller that can be configured to operate the UAV to begin a flight along a first flight path to a destination, and operate the backup navigation system in a feature localization mode in which the controller: (i) causes the image capture device to capture a first set of images along the first flight path, and (ii) analyzes the images to localize a set of visual features within the environment, where each localized visual feature is associated with a respective geolocation, and where the set of localized features is stored in a memory location. Yet further, the controller can be configured to detect a failure event involving the primary navigation system, and responsive to detecting the failure event, operate the backup navigation system in a UAV localization mode in which the controller: (i) causes the image capture device to capture at least one image of the environment, (ii) identifies in the at least one image visual features within the environment, and (iii) compares the identified visual features to the set localized visual features stored in the memory location.

In yet another aspect, a method is provided. The method can include operating an unmanned aerial vehicle (UAV) to begin a flight to a destination, wherein the UAV uses a primary navigation system to navigate to the destination. The method can also include operating an image capture device coupled to the UAV and having a field-of-view (FOV) of an environment of the UAV to capture a first set of images during the UAV's flight, and analyzing the images to identify visual features within the environment. Also, the method can include determining a current location of the UAV by determining a relationship between one of the identified visual features and a localized visual feature in a map stored in a memory of the UAV. Further, the method can include comparing the current location to location data from the primary navigation system, and responsive to detecting a discrepancy between the current location and the location data from the primary navigation system, outputting an alert indicating failure of the primary navigation system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 is a simplified block diagram illustrating a UAS deployment system, according to an example implementation.

DETAILED DESCRIPTION

Figure 1A:
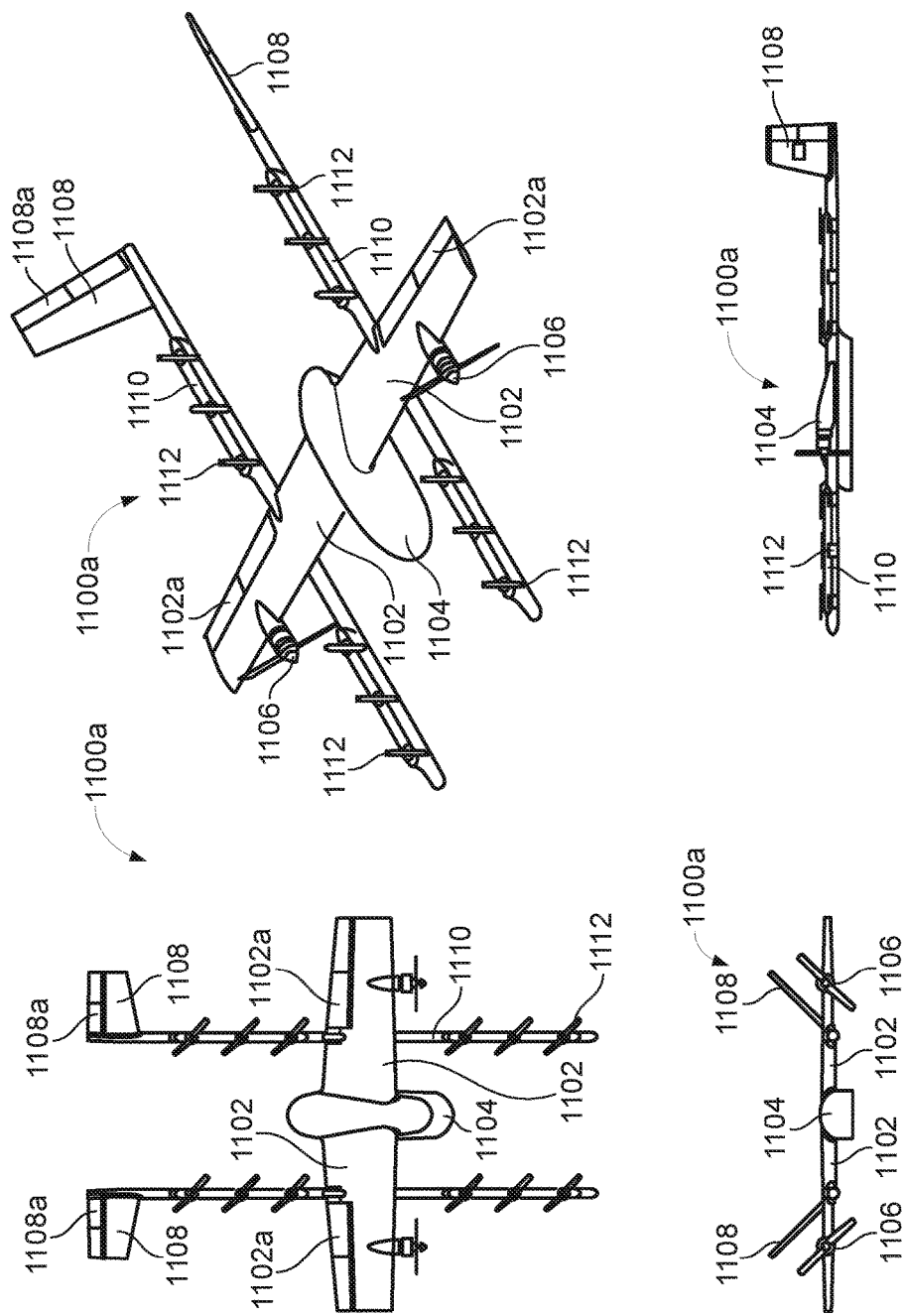
FIG. 1A is a simplified illustration of an unmanned aerial vehicle, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

An Unmanned Aerial Vehicle (UAV) can perform a task that involves flying to one or more destinations, e.g., picking up and/or delivering an item. In practice, the UAV can include a navigation system that the UAV relies on to navigate to a particular location or locations. This navigation system may be referred to herein as the UAV's "primary navigation system." In example embodiments, the UAV's primary navigation system can rely upon a signal from a on the Global Positioning System (GPS) to provide coordinates for navigation.

However, the primary navigation system could fail or be rendered temporarily inoperable in a manner that affects the ability of the UAV to remain on its flight path and/or safely navigate to a target location. In some instances, the failure event could render the system inoperable, which could result in a catastrophic event, such as the UAV crashing. In other instances, GPS can be spoofed, which can result in problems such as an unauthorized party taking control of it. Therefore, it is desirable to equip the UAV with a backup navigation system that can replace at least some of the navigational functionality of the primary navigation system in the event that the primary navigation system becomes inoperable or is spoofed (e.g., an unauthorized party controlling GPS).

Current backup navigation systems typically employ one of two classes of computer vision algorithms. The first class includes Visual Odometry (VO) or Visual-Inertial Odometry (VIO) algorithms that are capable of providing relative position estimates (i.e., an estimate of the difference in position of the UAV between two points in time). The second class includes Simultaneous Localization And Mapping (SLAM) algorithms that are capable of providing global position estimates (i.e., an estimate of the position of the UAV at all times with respect to a some fixed reference point, such as the starting location of the UAV). However, both of these classes have shortcomings. Specifically, a VIO dependent system only provides relative position estimates, which, on its own, is not typically sufficient for autonomous navigation over long distances due to increasing position error. Further, the complexity of SLAM algorithms means that the SLAM dependent system is typically unable to provide real-time location data, which is required (or at least highly desirable) for a reliable autonomous navigation system. Accordingly, example embodiments can help to provide a more reliable backup navigation system, which utilizes real-time image data for navigation.

More specifically, example backup navigation systems can provide real-time updates to the UAV so that UAV can navigate to a safe landing zone in the event that the primary navigation system fails. In the event of a failure, such a backup navigation system can navigate the UAV using maps that were generated during flight, using actual imagery captured by the UAV, before the failure occurred. In particular, during the UAV's flight to a destination, before the failure event occurs, the backup navigation system can operate in a first mode in which the system can acquire and use environmental image data to generate and update a map of an environment along the UAV's flight path. Then, when a failure event occurs, the backup navigation system can transition to operating in a second mode in which the system can use the generated maps to navigate the UAV back to a safe landing zone.

More specifically, the backup navigation system can begin to operate in the first mode, also called a "feature localization mode," when the UAV begins its flight to the destination. Note that when the backup navigation system is operating in the feature localization mode, the UAV is relying on the primary navigation system for navigation. Furthermore, in the feature localization mode, the backup navigation system can generate and/or update a map of the UAV's environment during the UAV's flight to the destination. In an implementation, the system can generate and/or update the map by detecting features of the environment near the UAV's flight path to the destination. In an example, the system can detect features of the environment by capturing images of the environment and processing the images to detect features of the environment that were captured in the images. To facilitate capturing the images, the system can include an image capture device that is configured to capture images of the environment during the UAV's flight.

The backup navigation system can then determine a respective location for one or more of the detected features (i.e., localize the detected features). In an example, the system can localize a feature by using a known position and orientation of the UAV (provided by the primary navigation system) and multiple observations of the feature to triangulate the location of the feature. The localized features can be used to generate a flight log or map of the UAV's flight path to the destination. That is, each detected feature along the flight path is associated with at least a location in the environment. In some examples, a feature that was detected in a particular image can be associated with one or more characteristics indicative of the conditions in which the particular image was captured, such as time of day the image was captured, date the image was captured, weather at the location that the image was captured, among other characteristics.

In an embodiment, the backup navigation system can operate in the feature localization mode until the system detects that the primary navigation system is inoperable, at which point the backup navigation system can responsively transition to operating in the second mode, also called a "UAV localization mode." In the UAV localization mode, the backup navigation system can be responsible for navigating the UAV to a safe landing zone, such as the home base of the UAV. In an implementation, responsive to the primary navigation system failing, the backup navigation system can navigate the UAV to its home base by flying the UAV along substantially the same flight path that the UAV flew to reach its current position (i.e., the position at which the primary navigation system failed). To navigate along the return flight path, the backup navigation system can use the map or flight log that was generated when the system was operating in the feature localization mode.

More specifically, the backup navigation system can use the map by capturing images of the UAV's current environment and processing the images to extract features of the environment. Then, the system can compare the extracted features to the localized features that are part of the generated map of the flight path. If the backup navigation system detects a relationship between the extracted features and the localized features, the backup navigation system can use the relationship and the map (i.e., known locations of the localized features) to determine a current location of the UAV. Based on the current location of the UAV, the backup navigation system can determine at least a portion of a flight path to the safe zone. For example, the backup navigation system can determine a portion of a flight path to the home base, where the flight path to the home base is substantially the same flight path as the initial flight path that the UAV flew to the UAV's current position. By determining a return flight path that is substantially along the initial flight path, the backup navigation system can use the generated map to navigate since the map includes localized features of the initial flight path. Accordingly, as the UAV travels along the return the flight path, the backup navigation system can use the map to identify localized features, and based on the localized features, can determine a current position of the UAV.

In some instances, the backup navigation system can determine to continue travelling to the original destination (i.e., continue the mission). In other instances, for various reasons (e.g., fuel considerations), the backup navigation system can determine to fly the UAV to a safe zone that is not in an area that was traversed by the UAV. In either instance, since the UAV did not traverse the area, the UAV may have not generated a map of the area, and therefore the backup navigation system may not be able to navigate to the desired safe zone. To overcome this obstacle, also disclosed herein is a method of compiling a database of localized features from images captured by a plurality of UAVs that are operating in a given area over a given amount of time. In particular, a controller of the database can process the images (and the features extracted from thereof) to generate one or more maps of the given area. Then any UAV whose flight path overlaps the given area will receive a copy of the one or maps so that the UAV's backup navigation system can use the maps to navigate to a safe zone in the given area.

Within examples, the controller of the database can generate spatial and temporal maps of a given area. That is, the controller can generate more than one map of the given area, where each map is associated with one or more temporal characteristics, such as a time of day and date. The time and date may be the time and date at which the images that were used to generate a map were captured. Then a UAV can use a spatial and a temporal map that is associated with the time and date of the UAV's flight. By using the spatial and temporal map that is associated with the time and date of the UAV's flight, the backup navigation system is more likely to detect known features in the environment.

Such a backup navigation system also provides improvement over image-based navigation systems since the backup navigation system can account for temporal changes in the environment. Generally, the visual features of an environment can vary depending on the time of the day, the date, weather conditions, season, etc. By generating a localized map when flying to a destination, the backup navigation system can capture visual features in the environment in their most recent state. Thus, the backup system has a higher probability of identifying the visual features when operating in the UAV localization mode. As also explained herein, the backup navigation system can associate the maps with temporal characteristics such as date or season.

In addition to providing backup navigation, the backup navigation system disclosed herein can also perform other functions, such as checking the integrity or accuracy of the navigation provided by the primary navigation system. In particular, the integrity of the primary navigation system can be compromised due to undetected malfunctions or malicious third-party attempts to compromise the system (e.g. GPS spoofing). In either case, the compromised primary navigation system can give hazardous and misleading information (HMI) to the flight control system, leading to potential safety issues. In an implementation of this function, the backup navigation system can periodically determine the UAV's location (e.g., using the methods described herein), and can then compare the UAV location to the location determined by the primary navigation system. In one example, if there is a discrepancy between the two locations that is a greater than a threshold, the backup navigation system can determine that the integrity of the primary navigation system has been compromised. In such scenarios, the backup navigation system can also override the primary navigation system to provide the UAV with an accurate navigation solution.

II. Illustrative UAVs

Herein, the terms "unmanned aircraft vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVs), or "unmanned aerial system" (UAS) may also be used to refer to a UAV.

FIG. 1A is a simplified illustration providing various views of a UAV, according to an example implementation. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other implementations, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn nose left or right) during flight. In some implementations, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
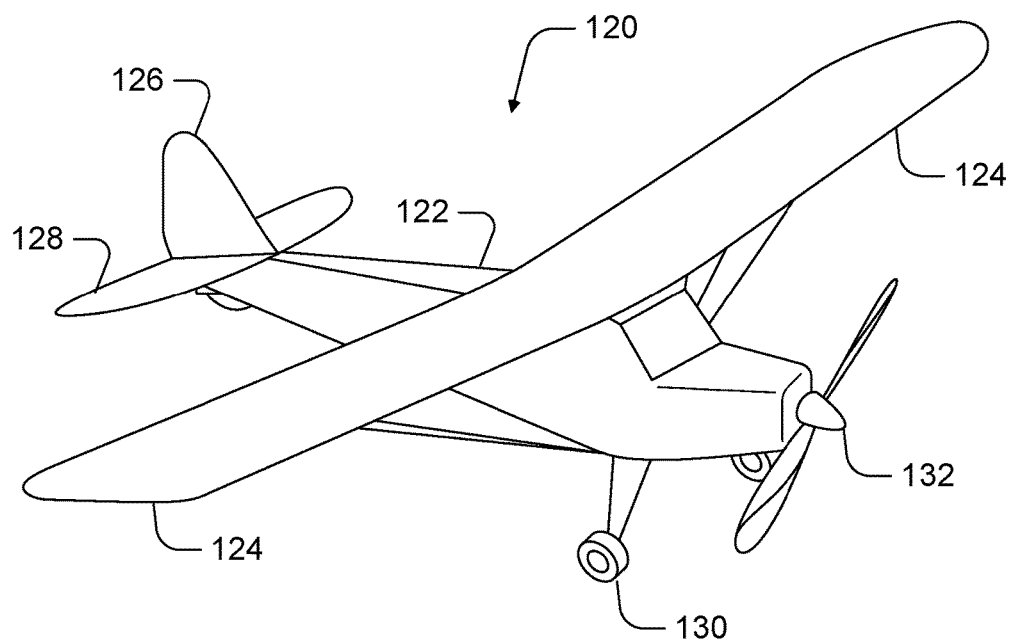
FIG. 1B is a simplified illustration of an unmanned aerial vehicle, according to an example implementation.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
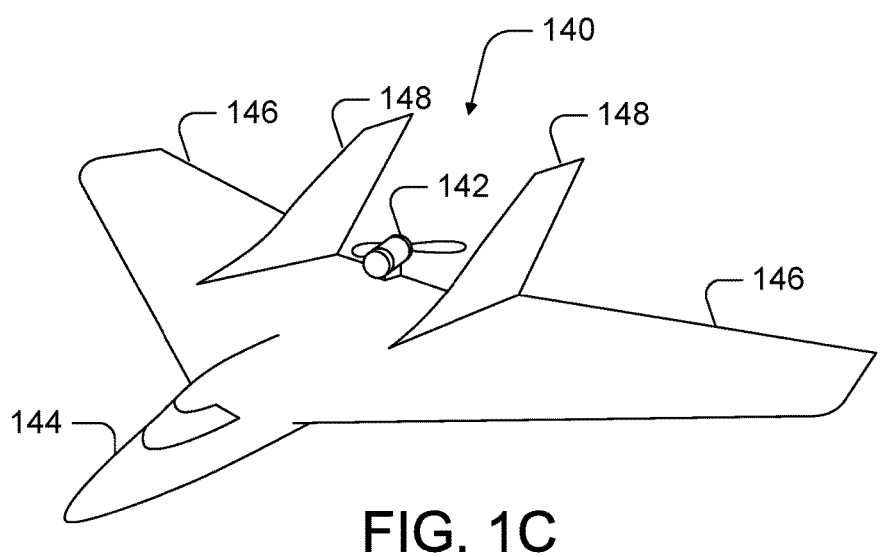
FIG. 1C is a simplified illustration of an unmanned aerial vehicle, according to an example implementation.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
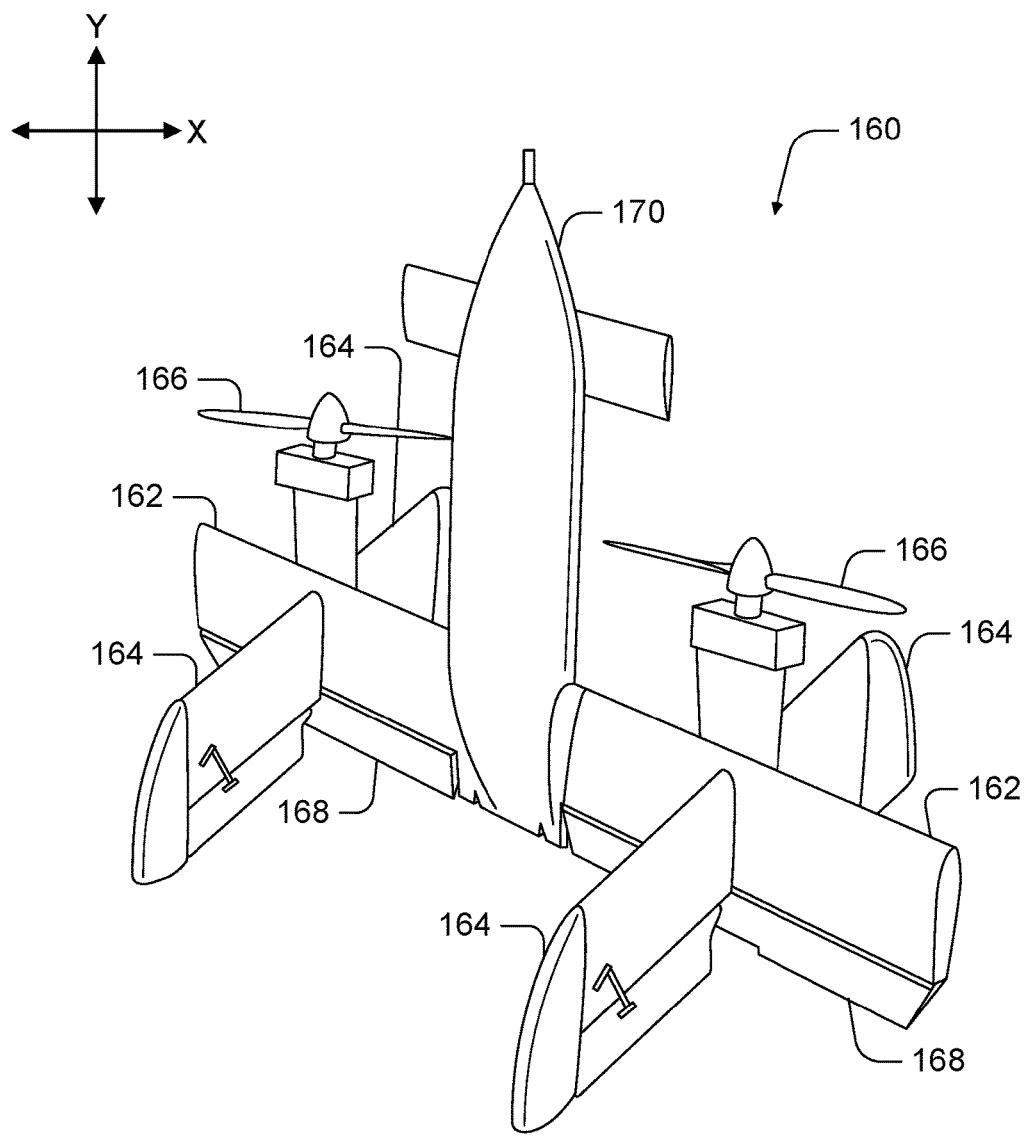
FIG. 1D is a simplified illustration of an unmanned aerial vehicle, according to an example implementation.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
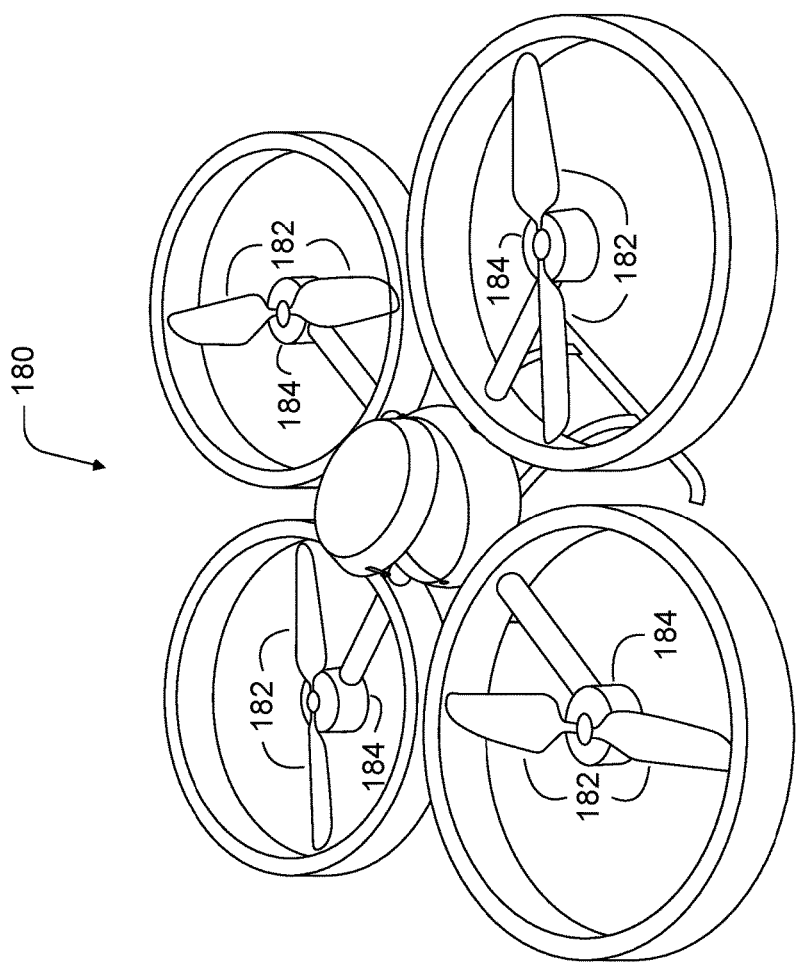
FIG. 1E is a simplified illustration of an unmanned aerial vehicle, according to an example implementation.

As noted above, some implementations may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example implementations may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some implementations, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example implementations may relate to, be implemented within, or take the form of any type of unmanned aerial vehicle.

III. Illustrative UAV Deployment Systems

The backup navigation system (and the corresponding methods) disclosed herein can relate to, be implemented within, or any kind of UAV or UAV system, such as UAVs that are configured for environment monitoring, photography, surveying, among other examples systems. Described below is an illustrative UAV deployment system. However, it should be understood that this system is not intended to be limiting, and that other systems are also possible.

UAV deployment systems may be implemented in order to provide various UAV-related services. In particular, UAVs may be provided at a number of different launch sites that may be in communication with regional and/or central control systems. Such a distributed UAV deployment system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 2 is a simplified block diagram illustrating a distributed UAV deployment system 200, according to an example implementation.

In the illustrative UAV deployment system 200, an access system 202 may allow for interaction with, control of, and/or utilization of a network of UAVs 204. In some implementations, an access system 202 may be a computing device that allows for human-controlled dispatch of UAVs 204. As such, the control system may include or otherwise provide a user interface through which a user can access and/or control the UAVs 204.

In some implementations, dispatch of the UAVs 204 may additionally or alternatively be accomplished via one or more automated processes. For instance, the access system 202 may dispatch one of the UAVs 204 to transport a payload to a target location, and the UAV may autonomously navigate to the target location by utilizing various on-board sensors, such as a GPS receiver and/or other various navigational sensors.

Further, the access system 202 may provide for remote operation of a UAV. For instance, the access system 202 may allow an operator to control the flight of a UAV via its user interface. As a specific example, an operator may use the access system 202 to dispatch a UAV 204 to a target location. The UAV 204 may then autonomously navigate to the general area of the target location. At this point, the operator may use the access system 202 to take control of the UAV 204 and navigate the UAV to the target location (e.g., to a particular person to whom a payload is being transported). Other examples of remote operation of a UAV are also possible.

In an illustrative implementation, the UAVs 204 may take various forms. For example, each of the UAVs 204 may be a UAV such as those illustrated in FIGS. 1A-1E. However, UAV deployment system 200 may also utilize other types of UAVs without departing from the scope of the invention. In some implementations, all of the UAVs 204 may be of the same or a similar configuration. However, in other implementations, the UAVs 204 may include a number of different types of UAVs. For instance, the UAVs 204 may include a number of types of UAVs, with each type of UAV being configured for a different type or types of payload delivery capabilities.

The UAV deployment system 200 may further include a remote device 206, which may take various forms. Generally, the remote device 206 may be any device through which a direct or indirect request to dispatch a UAV can be made. (Note that an indirect request may involve any communication that may be responded to by dispatching a UAV, such as requesting a package delivery). In an example implementation, the remote device 206 may be a mobile phone, tablet computer, laptop computer, personal computer, or any network-connected computing device. Further, in some instances, the remote device 206 may not be a computing device. As an example, a standard telephone, which allows for communication via plain old telephone service (POTS), may serve as the remote device 206. Other types of remote devices are also possible.

Further, the remote device 206 may be configured to communicate with access system 202 via one or more types of communication network(s) 208. For example, the remote device 206 may communicate with the access system 202 (or a human operator of the access system 202) by communicating over a POTS network, a cellular network, and/or a data network such as the Internet. Other types of networks may also be utilized.

In some implementations, the remote device 206 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV deployment system 200 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 210 may be a server or group of servers, which is configured to receive dispatch messages requests and/or dispatch instructions from the access system 202. Such dispatch messages may request or instruct the central dispatch system 210 to coordinate the deployment of UAVs to various target locations. The central dispatch system 210 may be further configured to route such requests or instructions to one or more local dispatch systems 212. To provide such functionality, the central dispatch system 210 may communicate with the access system 202 via a data network, such as the Internet or a private network that is established for communications between access systems and automated dispatch systems.

In the illustrated configuration, the central dispatch system 210 may be configured to coordinate the dispatch of UAVs 204 from a number of different local dispatch systems 212. As such, the central dispatch system 210 may keep track of which UAVs 204 are located at which local dispatch systems 212, which UAVs 204 are currently available for deployment, and/or which services or operations each of the UAVs 204 is configured for (in the event that a UAV fleet includes multiple types of UAVs configured for different services and/or operations). Additionally or alternatively, each local dispatch system 212 may be configured to track which of its associated UAVs 204 are currently available for deployment and/or are currently in the midst of item transport.

In some cases, when the central dispatch system 210 receives a request for UAV-related service (e.g., transport of an item) from the access system 202, the central dispatch system 210 may select a specific UAV 204 to dispatch. The central dispatch system 210 may accordingly instruct the local dispatch system 212 that is associated with the selected UAV to dispatch the selected UAV. The local dispatch system 212 may then operate its associated deployment system 214 to launch the selected UAV. In other cases, the central dispatch system 210 may forward a request for a UAV-related service to a local dispatch system 212 that is near the location where the support is requested and leave the selection of a particular UAV 204 to the local dispatch system 212.

In an example configuration, the local dispatch system 212 may be implemented as a computing device at the same location as the deployment system(s) 214 that it controls. For example, the local dispatch system 212 may be implemented by a computing device installed at a building, such as a warehouse, where the deployment system(s) 214 and UAV(s) 204 that are associated with the particular local dispatch system 212 are also located. In other implementations, the local dispatch system 212 may be implemented at a location that is remote to its associated deployment system(s) 214 and UAV(s) 204.

Numerous variations on and alternatives to the illustrated configuration of the UAV deployment system 200 are possible. For example, in some implementations, a user of the remote device 206 could request delivery of a package directly from the central dispatch system 210. To do so, an application may be implemented on the remote device 206 that allows the user to provide information regarding a requested delivery, and generate and send a data message to request that the UAV deployment system 200 provide the delivery. In such an implementation, the central dispatch system 210 may include automated functionality to handle requests that are generated by such an application, evaluate such requests, and, if appropriate, coordinate with an appropriate local dispatch system 212 to deploy a UAV.

Further, some or all of the functionality that is attributed herein to the central dispatch system 210, the local dispatch system(s) 212, the access system 202, and/or the deployment system(s) 214 may be combined in a single system, implemented in a more complex system, and/or redistributed among the central dispatch system 210, the local dispatch system(s) 212, the access system 202, and/or the deployment system(s) 214 in various ways.

Yet further, while each local dispatch system 212 is shown as having two associated deployment systems 214, a given local dispatch system 212 may alternatively have more or fewer associated deployment systems 214. Similarly, while the central dispatch system 210 is shown as being in communication with two local dispatch systems 212, the central dispatch system 210 may alternatively be in communication with more or fewer local dispatch systems 212.

In a further aspect, the deployment systems 214 may take various forms. In general, the deployment systems 214 may take the form of or include systems for physically launching one or more of the UAVs 204. Such launch systems may include features that provide for an automated UAV launch and/or features that allow for a human-assisted UAV launch. Further, the deployment systems 214 may each be configured to launch one particular UAV 204, or to launch multiple UAVs 204.

The deployment systems 214 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some implementations, the deployment systems 214 and their corresponding UAVs 204 (and possibly associated local dispatch systems 212) may be strategically distributed throughout an area such as a city. For example, the deployment systems 214 may be strategically distributed such that each deployment system 214 is proximate to one or more payload pickup locations (e.g., near a restaurant, store, or warehouse). However, the deployment systems 214 (and possibly the local dispatch systems 212) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV deployment system 200 may include or have access to a user-account database 216. The user-account database 216 may include data for a number of user accounts, and which are each associated with one or more person. For a given user account, the user-account database 216 may include data related to or useful in providing UAV-related services. Typically, the user data associated with each user account is optionally provided by an associated user and/or is collected with the associated user's permission.

Further, in some implementations, a person may be required to register for a user account with the UAV deployment system 200, if they wish to be provided with UAV-related services by the UAVs 204 from UAV deployment system 200. As such, the user-account database 216 may include authorization information for a given user account (e.g., a username and password), and/or other information that may be used to authorize access to a user account.

In some implementations, a person may associate one or more of their devices with their user account, such that they can access the services of UAV deployment system 200. For example, when a person uses an associated mobile phone, e.g., to place a call to an operator of the access system 202 or send a message requesting a UAV-related service to a dispatch system, the phone may be identified via a unique device identification number, and the call or message may then be attributed to the associated user account. Other examples are also possible.

IV. Navigation System

In line with the discussion above, a UAV can include a primary navigation system that can navigate the UAV to a destination, which can be specified in various formats, such as coordinates. The primary navigation system can use the destination information (e.g., GPS coordinates) to determine how to navigate to the destination. For instance, the primary navigation system can generate a flight path from a starting position to the destination, and can then navigate the UAV along the flight path.

However, as explained above, the primary navigation system can encounter a failure event during the UAV's flight. The failure event can cause significant failures or losses, such as the UAV not reaching its destination, or even worse, a crash. To help avoid such losses or failures, it is desirable to equip the UAV with a backup navigation system that can replace at least some of the navigational functionality of the primary navigation system in the case that the primary navigation system encounters a failure event.

Accordingly, disclosed herein is a backup navigation system that can provide the UAV with navigational functionality in the event that the primary navigation system fails. Within examples, the backup navigation system can operate using resources of the UAV and can operate without relying on a remote server. Thus, even if the failure event affects all of the communication systems of the UAV, the backup navigation system can provide the UAV with navigational functionality. For instance, the backup navigation system can navigate the UAV to a safe landing area in response to detecting that the UAV and/or the primary navigation system has encountered a failure event. In an implementation of the backup navigation system, the system can provide navigational functionality by generating and/or updating a map of the UAV's flight path during the UAV's flight to a destination. Then, if a failure event occurs, the backup navigation system can use the generated map to navigate the UAV to a safe landing area.

In an embodiment, the backup navigation system can generate and/or update a map of the UAV's flight path by capturing images of the UAV's environment during the UAV's flight along the flight path. As described below, the backup navigation system can generate and/or update the map of the UAV's flight path by using the captured images and location information associated with the images (which can be received from the primary navigation system).

Figure 3:
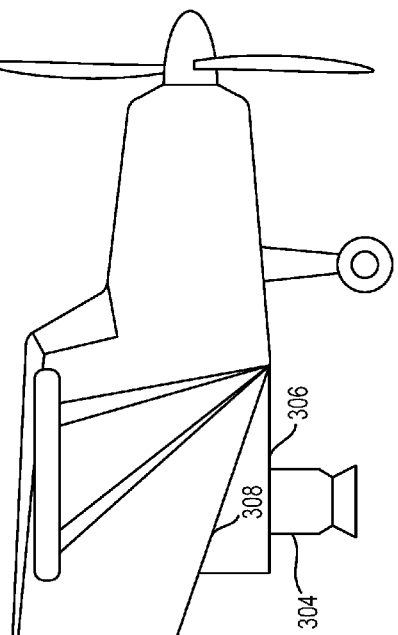
FIG. 3 is a simplified illustration of an unmanned aerial vehicle equipped with a backup navigation system, according to an example implementation.

FIG. 3 illustrates a UAV 300 equipped with a backup navigation system, according to an exemplary embodiment. As illustrated in FIG. 3, the backup navigation system can include an image capture device 304 that is configured to capture images of the UAV's environment. In some examples, the image capture device 304 can be directly coupled to the body of the UAV 300. For instance, the image capture device 304 can be rotatably coupled to the body of the UAV 300 so that the backup navigation system can control the orientation of the image capture device 304. Further, the image capture device can be directly coupled within or directly to the body of the UAV 300 or can be coupled to the UAV 300 via a mount or other coupling mechanism. For instance, as illustrated in FIG. 3, the image capture device 304 is rotatably coupled to a mount 306 coupled to a bottom surface 308 of the UAV 300.

Within examples, the backup navigation system can orient the backup navigation system in various orientations. As illustrated in FIG. 3, the image capture device 304 can be oriented perpendicular to the UAV 300. In this arrangement, the image capture device 304 can capture images of an environment the UAV 300 that is below the UAV 300. The backup navigation system can also orient the image capture device 304 in other orientations, such as a forward facing orientation. In the forward facing orientation, the image capture device 304 can capture at least a portion of the environment in front of the UAV 300.

The image capture device 304 can be a device that is configured to capture still images, video, and/or other sensor data. For instance, the image capture device 304 can be a camera (e.g., a CCD image sensor), a LIDAR device, a time-of-flight camera, a structured light scanner, and/or a stereo camera, among other possibilities. The image capture device 304 can be configured to capture images at various resolutions or at different frame rates. In some examples, the specifications (e.g., resolution) of the image capture device 304 can depend on the specifications of the UAV 300 (e.g., maximum altitude of the UAV). For instance, a UAV that is configured to fly at a high altitude can include an image capture device with a higher resolution than an image capture device of a UAV that is configured to fly at a low altitude.

Furthermore, in the UAV configuration illustrated in FIG. 3, the image capture device 304 is positioned on the surface 308 of the UAV 300; however, the image capture device 304 can be positioned on other parts of the UAV 300. Further, although FIG. 3 illustrates one image capture device 304, more image capture devices can be used, and each can be configured to capture the same view, or to capture different views. For example, another image capture device can be positioned on a front surface of the UAV 300 to capture at least a portion of a view in front of the UAV 300.

In an embodiment, the UAV 300 can be tasked with flying to a particular destination. In order for the UAV 300 to fly to the destination, the primary navigation system of the UAV 300 can determine a flight path from a starting point (e.g., UAV 300's home base) to the destination, where the flight path is a defined path of position and altitude along which the UAV can fly. Within examples, the primary navigation system can determine the flight path based on one or more factors, such as time, distance, environmental considerations (e.g., weather), etc. Additionally and/or alternatively, the primary navigation system can determine a flight path that optimizes for one or more of the factors, which, in some examples, the system can optimize for based on a user preference. For instance, the primary navigation system can generate one or more flight paths that reach the destination, and can then select the flight path that can be traversed the quickest.

In an embodiment, the primary navigation system can navigate the UAV 300 along the flight path to the destination. In some examples, the primary navigation system can rely on a satellite or other remote computing device for positional information of the UAV 300, which the system can then use to determine a flight path of the UAV 300. By way of example, the primary navigation system can rely on GPS that can provide the system with the UAV's GPS coordinates. The system can then use the UAV's GPS coordinates to determine the UAV's location with respect to the flight path, and can make adjustments to the flight path and/or the UAV's operation (e.g., speed, flight altitude, etc.) as necessary.

During the UAV 300's flight along the flight path, the primary navigation system can navigate the UAV 300 as long as the UAV 300 has not encountered a failure event. As such, when the primary navigation system is functioning, the backup navigation system does not need to provide the UAV 300 with navigational updates. Nonetheless, the backup navigation system can operate when the primary navigation system is functioning and navigating the UAV 300. In particular, the backup navigation system can operate in a mode in which the system can generate and/or update maps of the UAV 300's flight path. In this mode (also referred to herein as a "feature localization mode"), the backup navigation system can detect unique visual features of the UAV 300's environment along the UAV 300's flight path, and can determine respective locations of the unique visual features.

A unique visual feature in the environment is any feature that has one or more unique characteristics that allow the feature to be detected, such as design characteristics of a structure, shape and dimensions of a feature, aesthetic characteristics (e.g., color), among other example characteristics. Note that detecting a feature does not require identifying a type of the feature. Rather detecting a feature can involve associating the feature characteristics with a unique identifier such that if the feature characteristics are detected again, the UAV can determine the feature with which the characteristics are associated. Example visual features include a structure (e.g., a building, an oil rig, etc.), an open area (e.g., a park, a parking lot, etc.), a vehicle, a sign (e.g., a billboard, a road sign, etc.), an infrastructure structure (e.g., a traffic light, a water tower, etc.), an environmental feature (e.g., a hill, a flat terrain, a water body, etc.), among other examples.

In an embodiment, the backup navigation system can detect unique visual features in the environment by processing captured images of the environment and detecting visual features in the images. For instance, the backup navigation system can cause the image capture device 304 to periodically capture images of the UAV 300's environment as the UAV 300 flies along the flight path. Then, the backup navigation system can process the captured images to detect visual features in the images. Within examples, the portion of the environment that is captured in the image depends on a location of the UAV 300, specifications of the image capture device 304, and the orientation of the image capture device 304.

Once the image is captured, the backup navigation system can process the image to detect unique visual features in the portion of the environment captured in the image. As explained above, identifying a unique visual feature does not require identification of the type of visual feature (e.g., that a particular feature is a building). Rather, identifying a unique visual feature can involve detecting identifiable characteristics of the feature, where the identifiable characteristics can be used to identify the feature at a later time. Such characteristics include design features of a structure (e.g., contours, edges, etc.), shape and dimensions of a feature, aesthetic characteristics (e.g., color), among other example characteristics. Within examples, the backup navigation system can detect features using feature detection algorithms such as edge detection algorithms (e.g., Canny, Harris & Stephens, etc.), corner detection algorithms (e.g., Shi & Tomasi, FAST, etc.), blob detection algorithms (e.g., Laplacian of Gaussian, Difference of Gaussians, etc.) among other feature detection algorithms. Upon detecting these features the backup navigation system can extract unique identifiable characteristics of those features using feature extraction algorithms such as scale-invariant feature transform (SIFT), speeded up robust features (SURF), BRIEF (Binary Robust Independent Elementary Features), Oriented FAST Rotated BRIEF (ORB), (Fast Retina Keypoint) FREAK, Learned Invariant Feature Transform (LIFT).

Once a unique visual feature is identified, the backup navigation system can then determine a location of the visual feature. Determining the location of a visual feature is also referred to herein as "feature localization." The backup navigation system can associate each image captured with a location of the UAV 300 when the image was captured. Although the image capture device 304 can detect visual features from a single image, e.g., image 420, accurately localizing a feature from two-dimensional images typically involves using two or more images that show two or more vantage points of the same features. Accordingly, in order to determine a respective location for one or more of the detected features, the image capture device 304 can capture another image of at least some of the detected features.

As explained above, the image capture device 304 can periodically capture images of the UAV 300's environment during the UAV 300's flight. Accordingly, another image of a detected feature can be captured subsequent to capturing the image 420. In an embodiment, the image capture device 304 can find another vantage point of a feature by extracting visual features from subsequently captured images and comparing the extracted visual features to the detected visual feature. In an embodiment, comparing an extracted visual feature to the detected visual feature can involve grayscale matching, gradient matching, histogram matching, and other feature matching algorithms, such as brute-force matching and Fast Library for Approximate Nearest Neighbors (FLANN) based matching. Additionally or alternatively, in some embodiments, the comparison may include various image registration or morphing algorithms.

If a match between an extracted visual feature and a detected visual feature is detected (i.e., two vantage points of the same feature is detected in two or more different images), the backup navigation system can determine a location of the feature. In particular, the backup navigation system can use the location and orientation associated with each image in which the visual feature was detected in order to calculate the location of the visual feature. For example, the backup navigation system can use triangulation to determine the location of the visual feature from the locations associated with the two or more images in which the feature was detected. Other methods of calculating a feature's location from the images in which the feature is captured are also possible. For instance, a feature's location can be calculated using methods that employ optimization algorithms.

The backup navigation system can then store the localized feature in a memory of the UAV 300. In particular, the backup navigation system can store data indicative of identifiable characteristics of the localized feature, such as a respective portion of each image that includes the localized feature or any other data that can be used to identify the feature. Additionally, the backup navigation system can store data indicative of a location of the localized feature. Additionally and/or alternatively, the backup navigation system can store data indicative of the conditions under which the images that included the feature were captured. Such conditions include operating conditions of the UAV 300 and/or the image capture device 304 when the image was captured, such as the altitude of the UAV 300, the location of the UAV 300, the orientation of the image capture device 304, the resolution of the image capture device 304, among other operating conditions.

In an embodiment, the backup navigation system can use the stored data to generate a visual log or map of the flight path. That is, the backup navigation system can generate a map that includes the features that are localized during the UAV 300's flight. In the generated map, each feature can be placed at its respective location, and therefore, the map can be representative of the environment along the flight path to the destination. Additionally, the map can be updated each time that the backup navigation system localizes a feature along the flight path.

In an embodiment, the backup navigation system can operate in the feature localization mode until the primary navigation system encounters a failure event. That is, the backup navigation system can generate and/or update one or more maps of the environment around the flight path until the primary navigation system encounters the failure event. Within examples, the failure event can be any event that affects the functionality of the primary navigation system, such as a loss of connectivity with remote servers and/or satellites that provide the primary navigation system with location information, malfunctioning of devices of the primary navigation system (e.g., a receiver), among other failure events. For instance, the primary navigation system can lose signal from the satellite on which it relies when the UAV 300 enters an area where satellite signals are attenuated or blocked (e.g., in a city).

As explained above, encountering such failure events can render the primary navigation system inoperable, and the primary navigation system may not be able to navigate the UAV 300 to the destination. Accordingly, to avoid undesirable consequences, the UAV 300, responsive to the UAV 300 and/or the primary navigation system encountering a failure event, can determine to return to a safe landing zone. In an example, the safe landing zone can be the location from which the UAV 300 launched, such as the UAV 300's home base. In another example, the safe landing zone can be located in an area near the UAV 300's flight path to the destination.

In an embodiment, the backup navigation system can navigate the UAV 300 to the location from which the UAV 300 began its current flight (i.e., the starting or launch point). In particular, responsive to detecting the failure event, the backup navigation system can transition from operating in the feature localization mode to operating in a UAV localization mode in which the system can determine a location of the UAV and can navigate the UAV to the safe zone. In order to navigate the UAV 300 to the safe zone, the backup navigation system can determine a current location of the UAV 300. And based on the current location of the UAV 300, the system can determine or update a return flight path from the location at which the UAV 300 was located when the failure event occurred to the safe zone.

In an embodiment, the backup navigation system can use the generated map of the flight path to the destination (i.e., initial flight path) to determine the UAV 300's location. To use the map, the backup navigation system can capture an image of the UAV 300's current environment, and can process the captured image to detect visual features of the environment. The backup navigation system can then compare the detected visual features to features in the map (i.e., features that were localized when the backup navigation system was operating in the feature localization mode). If the backup navigation system detects a relationship between the detected visual features and the localized features, the system can determine the location of the detected feature.

In an example, a relationship between the detected feature and the localized feature can be that the detected feature and the localized feature are the same feature in the environment. That is, the backup navigation system captured an image of a feature that it has localized before. In such an example, the detected feature has the same location as the localized features. In another example, the relationship between the features could be a known spatial relationship between the features. For instance, the detected feature could be located at a known distance away from the localized feature (e.g., a landmark), and by determining the location of the localized feature, the system can determine a location of the detected feature.

Once the backup navigation system determines a location of a detected feature, the system can then use the location of the feature to determine a location of the UAV 300. As explained above, in practice, determining a location from two-dimensional images can require two known locations in the images in order to use the known locations to calculate the unknown location. Therefore, in an embodiment, the backup navigation system can determine a respective location of two or more detected features in the captured image in order to determine a location of the UAV 300. By way of example, the backup navigation system can determine that two identified features match two respective localized features in the map, and can determine the location of the two identified features based on the locations of the respective localized features in the map. Then, the system can calculate the location of the UAV 300 using the locations of the two identified features. For instance, the system can use the two known locations to triangulate the location of the UAV 300.

In another embodiment, the backup navigation system can determine the location of the UAV from the location of a single detected feature. In particular, the system can use the location of the detected feature and information indicative of the orientation of the UAV to calculate an approximate location of the UAV. In an example, to perform this calculation, the system can assume that the height above ground level (AGL) of the image capture device (at the current location) is equal to the average AGL of the image capture device when capturing all of the images that were used to localize the feature. Given the average AGL, the current orientation of the UAV, and the field-of-view of the image capture device, a 3D volume above the detected feature within which the UAV should be located can be determined.

Once the backup navigation system has determined the current location of the UAV 300, the system can determine a flight path to the safe zone. This flight path is also referred to herein as a return flight path. In an embodiment, the backup navigation system can determine a return flight path that is identical or substantially similar to the initial flight path. A return flight path that is substantially similar to the initial flight path is a flight path where at least a given minimum number of the localized features are within the FOV of the image capture 304 throughout the flight.

In an example, the backup navigation system can use the generated map to determine the minimum number of localized features that the system would need to detect in order to navigate to the safe zone. The system can then determine the return flight path such that the minimum number of localized features is within the FOV of the image capture device 304 when the UAV 300 is flying along the return flight path.

In another example, the system can use the generated map to identify the localized features that the system would need to detect in order to reach the safe zone. The system can then determine the return flight path such that the localized features are within the FOV of the image capture device 304 when the UAV 300 is flying along the return flight path. By determining such a return flight path that is identical or substantially similar to the initial flight path, the backup navigation system can use the generated map of the initial flight path to navigate along the return flight path.

FIGS. 4A-4F depict a scenario 400 that illustrates operation of the backup navigation system, according to exemplary embodiments. In the scenario 400, the UAV 300 is flying from a starting point (e.g., a home base) to a destination. Before the UAV 300 begins the flight, the primary navigation system of the UAV 300 can determine a flight path from the starting point to the destination. Once the primary navigation system determines the flight path, the UAV 300 can fly along the determined flight path to the destination.

Figure 4A:
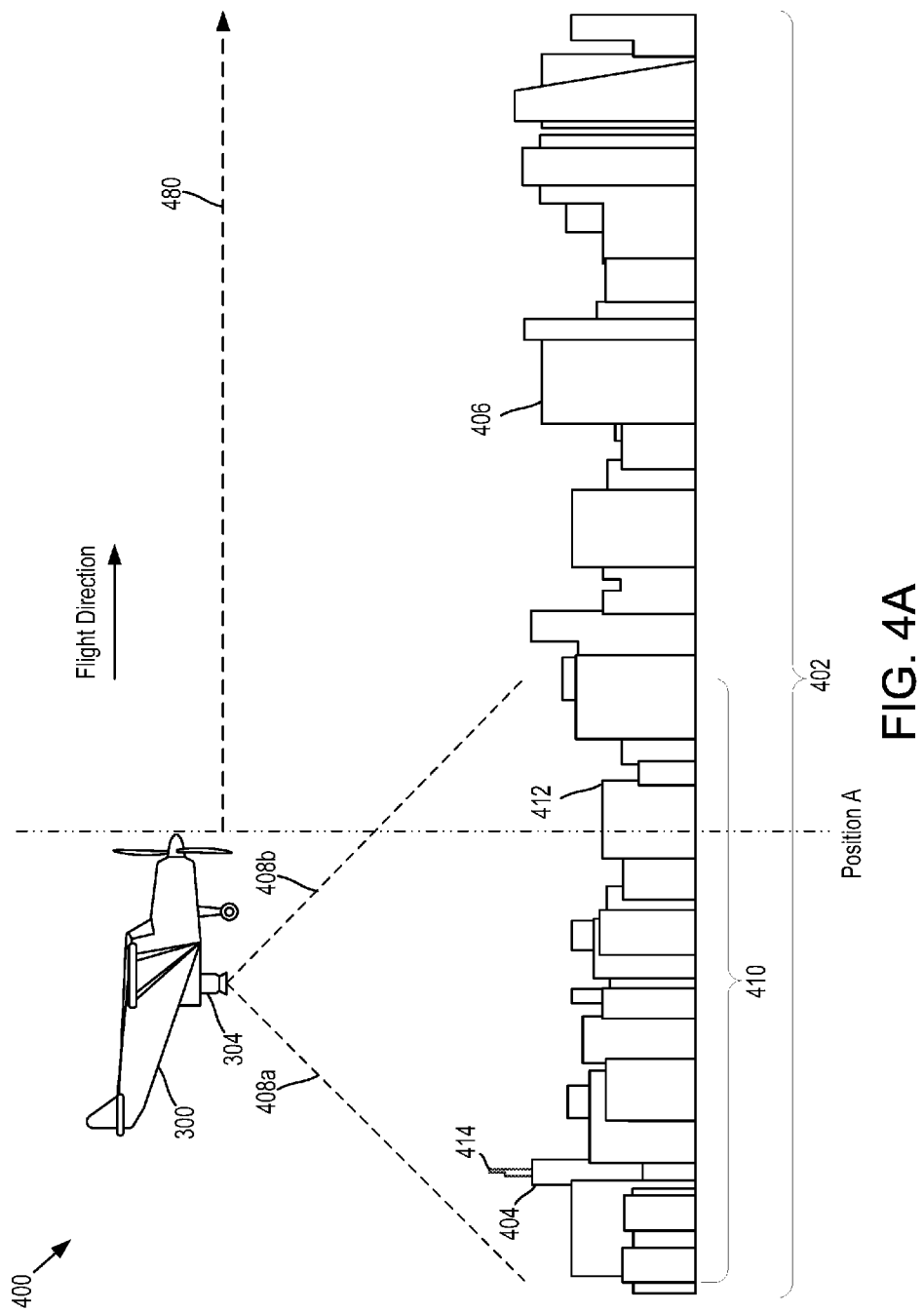
FIG. 4A is a side view of an unmanned aerial vehicle flying to a destination, according to an example implementation.

FIG. 4A illustrates the UAV 300's flight to a destination, according to an exemplary embodiment. In particular, the UAV 300 is flying along a flight path 480 that is determined by the primary navigation system (before the UAV 300 began the flight). During the flight, the primary navigation system is tasked with navigating the UAV 300 along the determined flight path. For instance, as illustrated in FIG. 4A, the primary navigation system has navigated the UAV 300 to reach a position "A" along the flight path 480. Further, the UAV 300 has not encountered a failure event, and therefore, the primary navigation system is still functioning. As such, the backup navigation system does not need to provide the UAV 300 with navigational updates.

However, as explained above, the backup navigation system can operate in the feature localization mode while the primary navigation system is navigating the UAV 300. In particular, the backup navigation system can generate and/or update a map of the UAV 300's environment. For instance, as illustrated in FIG. 4A, in the scenario 400, the flight path 480 passes over the city 402, where the city 402 includes structures 404, 406, and 412, among other structures and features. Accordingly, the UAV 300's environment in scenario 400 can be the city 402.

In an embodiment, the backup navigation system can detect features of the city 402 by capturing images of the city 402. For example, when the UAV 300 is at position A, the image capture device 304 can capture an image of the city 402. The portion of the city 402 that is captured in the image depends on a location of the UAV 300, specifications of the image capture device 304, and the orientation of the image capture device 304. As illustrated in FIG. 4A, since the UAV 300 is at position A, the image capture device 304 has a FOV of 90 degrees (i.e., area between lines 408*a* and 408*b*), and the image capture device 304 is oriented perpendicular to the UAV 300, the portion of the environment captured by an image is area 410 of the city 402. As shown in FIG. 4A, the buildings 404 and 412 are located in the area 410 of the city 402.

Figure 4B:
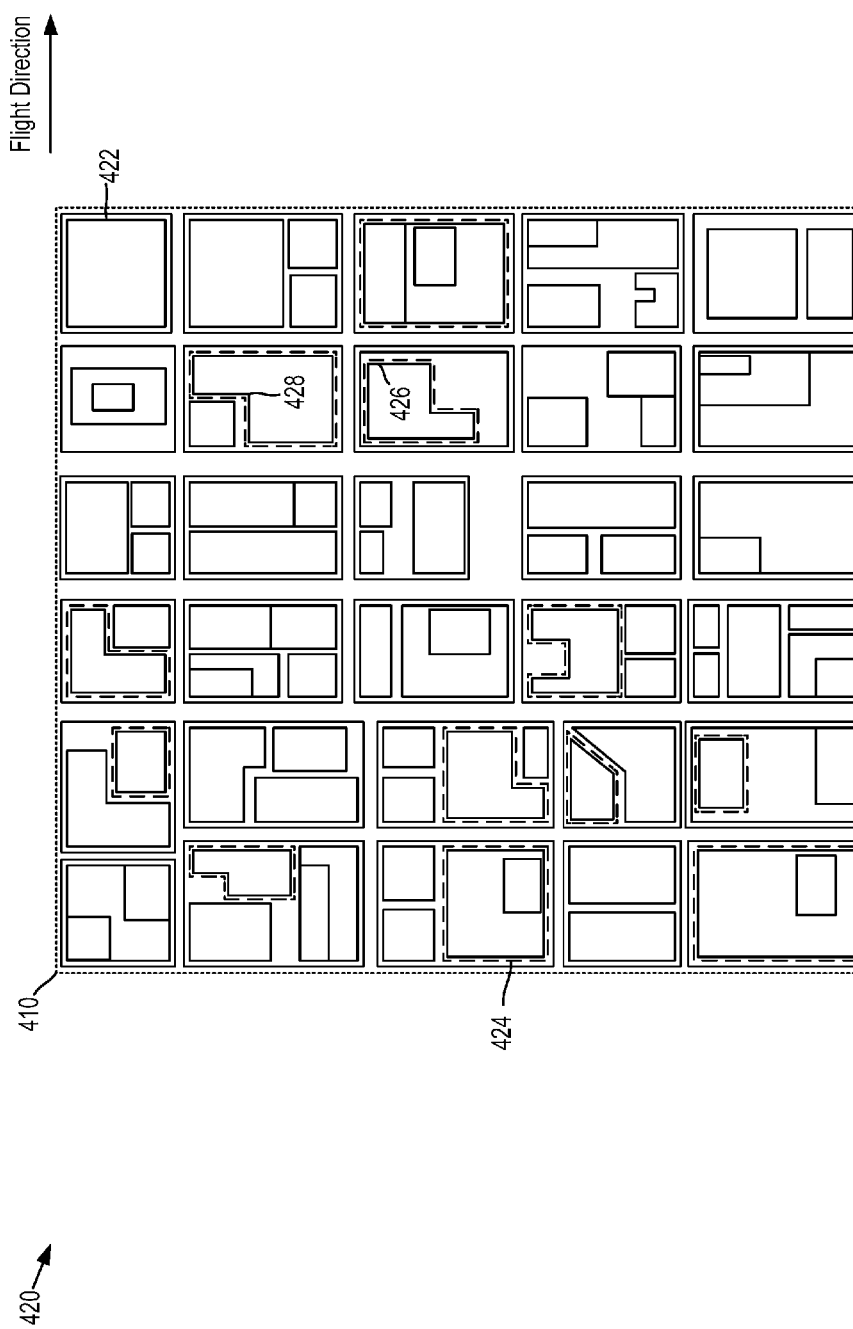
FIG. 4B is an image captured by an unmanned aerial vehicle, according to an example implementation.

FIG. 4B illustrates a representation of an image 420 of the area 410, according to an exemplary embodiment. In this scenario, the configuration of the image capture device 304 is such that image capture device 304 captures a top view image of the environment (e.g., the city 402). Accordingly, the vantage point of the image 420 is a top view (i.e., bird's eye view) of the area 410. The features of the area 410 that are captured by the image capture device 304 can depend on the specifications of the image capture device 304 (e.g., resolution, lens specifications, etc.) and on the altitude of the UAV 300 when the image 420 was captured. For instance, the image capture device 304 can capture structures (e.g., buildings), terrain, water bodies, and other features of the area 410. As illustrated in FIG. 4B, the image 420 includes an open area 422 (e.g., a park or parking lot), structures 422, 426, and 428, among other captured features. For the sake of simplicity, the image 420 includes large features such as structures or open areas, but in practice, other less prominent features (e.g., trees or signs) can also be captured in the image.

Once the image 420 is captured, the backup navigation system can process the image 420 to detect unique visual features in the area 410, such as structures or open areas. As explained above, identifying a unique visual feature does not require identification of the type of visual feature (e.g., that a particular feature is a building). Rather, identifying a unique visual feature can involve detecting identifiable characteristics of the feature, where the identifiable characteristics can be used to identify the feature at a later time. Such characteristics include design features of a structure (e.g., contours, edges, etc.), shape and dimensions of a feature, aesthetic characteristics (e.g., color), among other example characteristics. Within examples, the backup navigation system can detect features using feature detection algorithms such as edge detection algorithms (e.g., Canny, Harris & Stephens, etc.), corner detection algorithms (e.g., Shi & Tomasi, Laplacian of Gaussian, etc.), among other feature detection algorithms.

For example, the backup navigation system can process the image 420 to detect features in the area 410. By way of example, by processing the image 420 the backup navigation system can detect structures 424, 426, and 428, and open area 422, among other features. The backup navigation system can then extract data that represents the unique identifiable characteristics of the features (e.g., patch of the image in the vicinity of the feature, histogram of a patch of the image centered on the feature, etc.). The backup navigation system can then store the detected features in a memory of the UAV 300.

As explained above, more than one vantage point of a feature can be used to calculate a location of the feature. Accordingly, the image capture device 304 can capture another image of the city 402 in order to localize one or more visual features in the city 402. As explained above, the image capture device 304 can be configured to periodically capture images of the UAV 300's environment. Accordingly, the backup navigation system can compare features that are captured in a first image to features that are captured in subsequent images to find other vantage points of the features captured in the first image. If the backup navigation system detects another vantage point of a feature in a subsequent image, the system can use the vantage point from the first image and the vantage point from the subsequent image to determine the location of the feature.

Figure 4C:
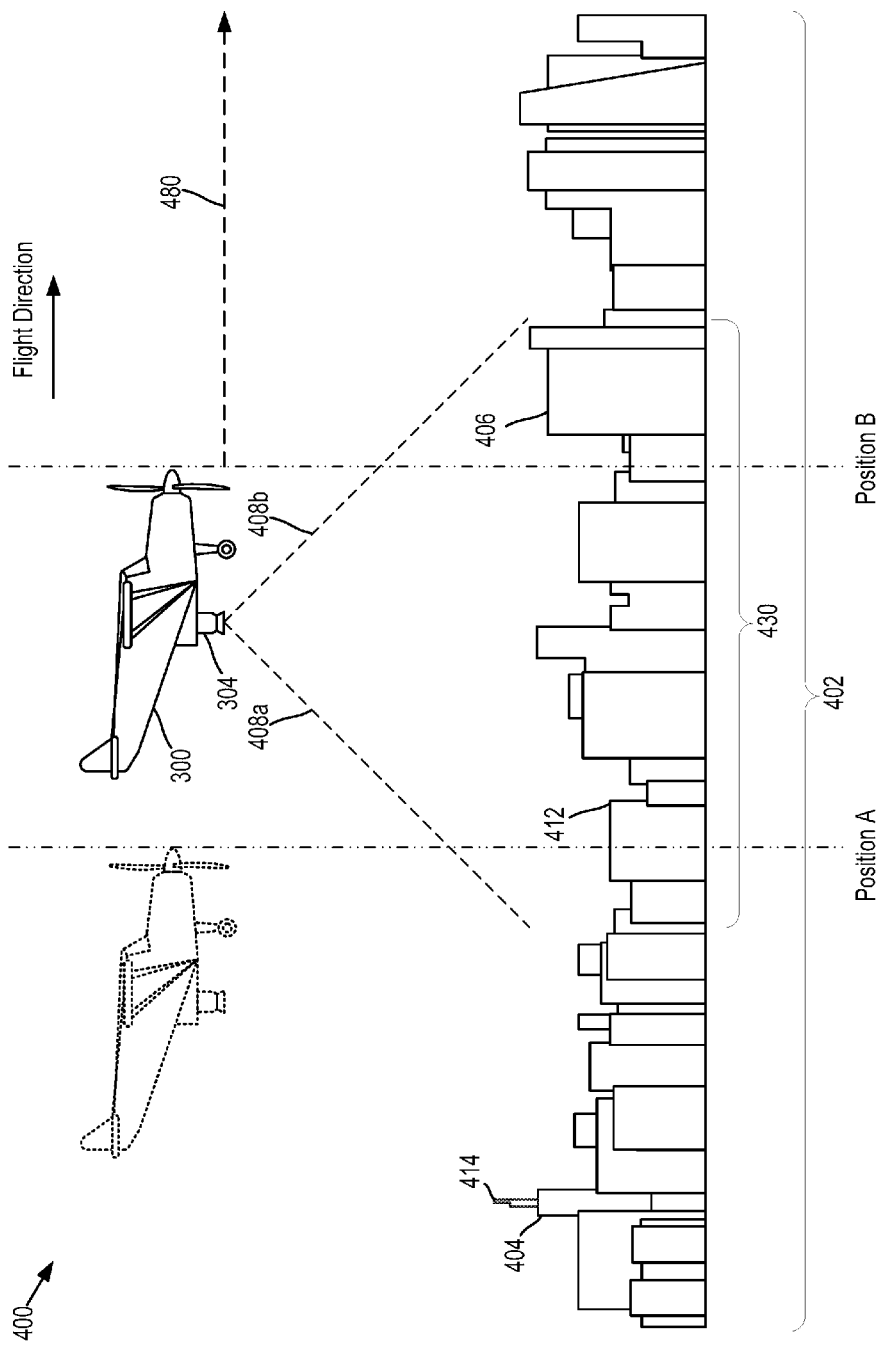
FIG. 4C is another side view of an unmanned aerial vehicle flying to a destination, according to an example implementation.

FIG. 4C depicts the UAV 300 at position "B" along the UAV 300's flight path 480. At position B, the image capture device 304 can capture an image of the city 402. As illustrated in FIG. 4C, the image capture device 304 can capture an image of an area 430 that is within the FOV of the image capture device 304 when the UAV 300 is at position B. The backup navigation system can process the image 432 to extract features that are located in the area 430. The system can then compare the extracted features to features that were detected in the image 420 in order to determine whether the image 432 includes another vantage point of the features detected in image 420.

Figure 4D:
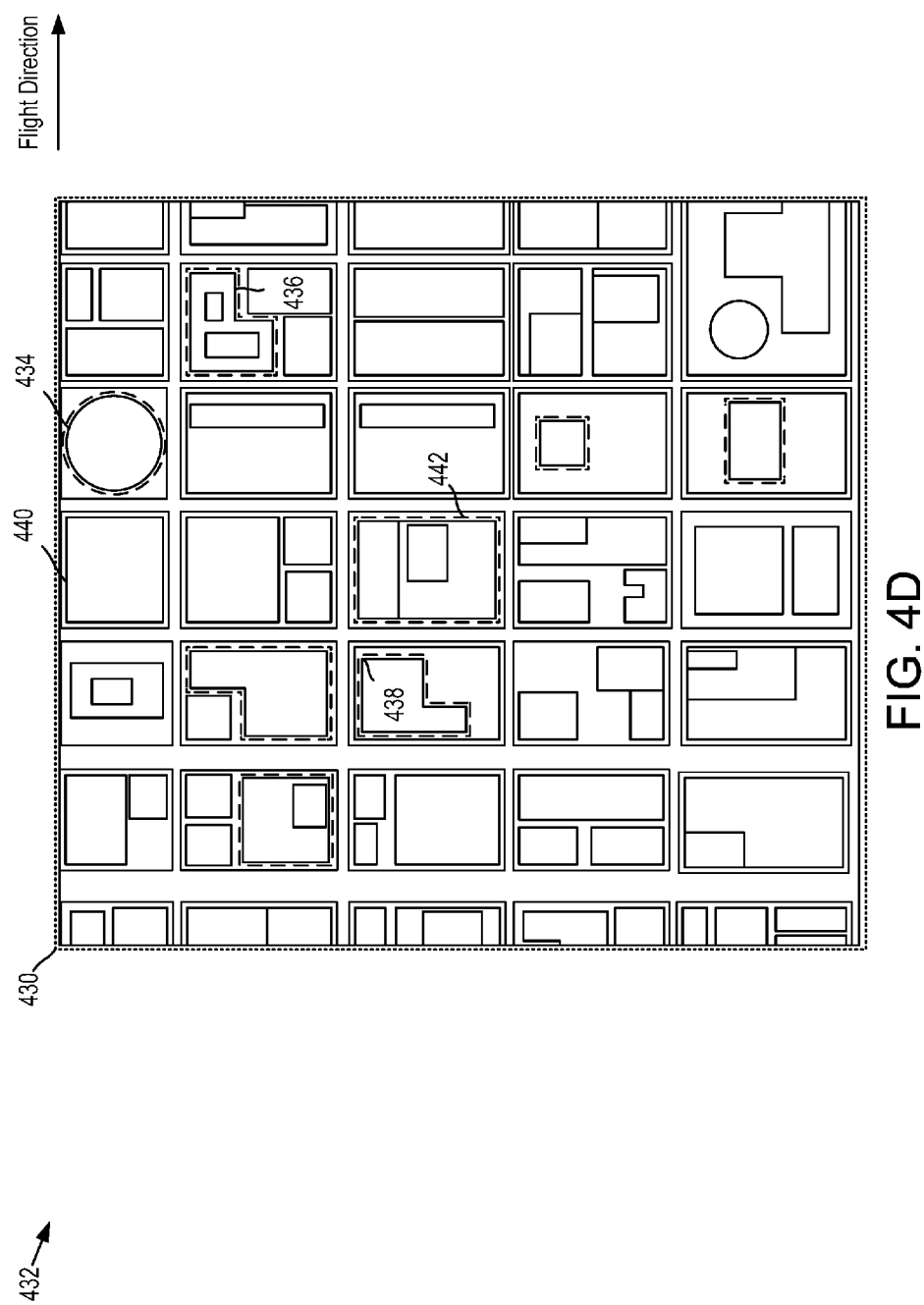
FIG. 4D is another image captured by an unmanned aerial vehicle, according to an example implementation.

FIG. 4D depicts an image 432 of the area 430, according to an exemplary embodiment. Like image 420 of FIG. 4B, the image 432 captures structures and open areas that are located in the area 430. As illustrated in FIG. 4D, the image 432 includes buildings, such as buildings 438 and 436, parking lots, such as parking lot 440, and other features, such as a water fountain 434. Further, the backup navigation system can process the image 432 to identify unique visual features of the area 430. For instance, processing the image can identify the features 436, 438, and 442. As illustrated in FIG. 4D, the detected features are marked by a dotted line. The backup navigation system can then compare one or more visual features detected in the image 420 to one or more visual features detected in the image 432. By way of example, by performing the comparison, the backup navigation system can detect that the feature 426 in the image 420 and the feature 438 in the image 432 correspond to one another. That is, the feature 426 and the feature 438 are both indicative of the same building, building 412. As illustrated in FIGS. 4A and 4C, building 412 is in the FOV of the image capture device 304 when the UAV 300 is at position A and when the UAV 300 is at position B. Accordingly, the building 412 can be captured in the images taken at both position A and position B.

The backup navigation system can then use the two vantage points of building 412 to determine a location of the building 412. In an embodiment, the backup navigation system can use the respective location information that is associated with the images 420 and 432 to determine the location of the building 412. In an example, the location of the building 412 can be determined using triangulation. Furthermore, more than two images can be used to determine a location of a feature detected in the images.

The backup navigation system can then store the localized feature in a memory of the UAV 300. Additionally, the backup navigation system can localize other features located in the two images 420, 432. The backup navigation system can also capture other images of the city 402 and localize other features of the city 402. The backup navigation system can then use the localized features to generate and/or update a map of the flight path 480. For example, the map can include the building 412 that has been localized. The map can indicate the location of the building 412 in the city 402 and can also indicate unique characteristics of the building 412 that can be used to identify the building 412.

As explained above, the backup navigation system can operate in the feature localization mode until the UAV 300 detects a failure event that can affect the operability of the primary navigation system. Responsive to detecting the failure event, the backup navigation system can transition from operating in the feature localization mode to operating in the UAV localization mode.

Figure 4E:
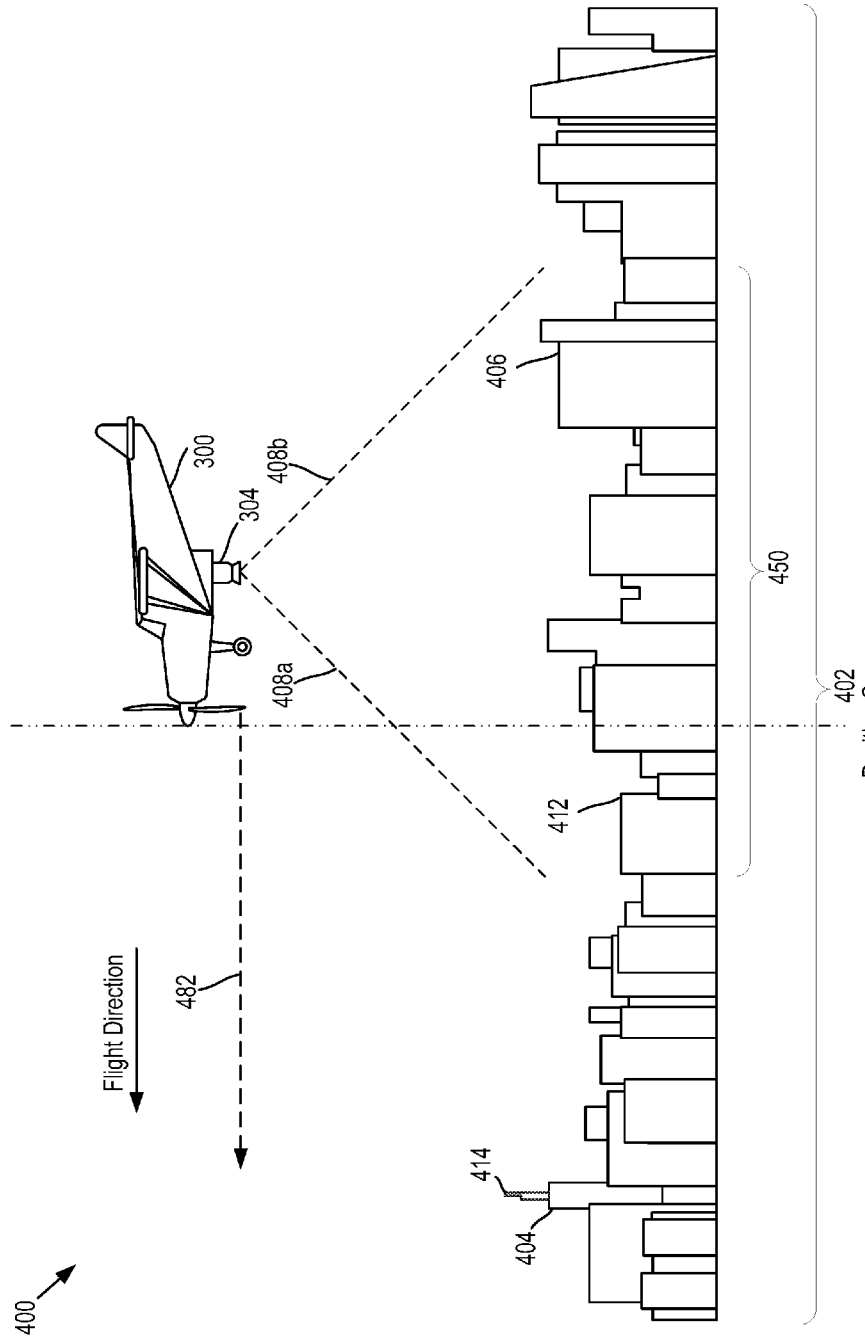
FIG. 4E is another side view of an unmanned aerial vehicle flying to a destination, according to an example implementation.

FIG. 4E illustrates the UAV 300 that has encountered a failure event, according to an example embodiment. In particular, at the position C along the flight path, the primary navigation system encounters a failure event. And responsive to detecting the failure event, the backup navigation system can transition from operating in the feature localization mode to operating in the UAV localization mode. As explained above, in the UAV localization mode, the backup navigation system can navigate the UAV 300 to a safe landing zone. In the scenario 400, the backup navigation system can determine to navigate the UAV 300 from position C and back to the starting point.

In an embodiment, the backup navigation system can determine the UAV 300's current position using the map of the flight path 480. In particular, the backup navigation system can cause the image capture device 304 to capture an image of the UAV 300's environment at position C. As illustrated in FIG. 4E, an area 450 of the city 402 is within the FOV of the image capture device 304 when the UAV 300 is at position C.

Figure 4F:
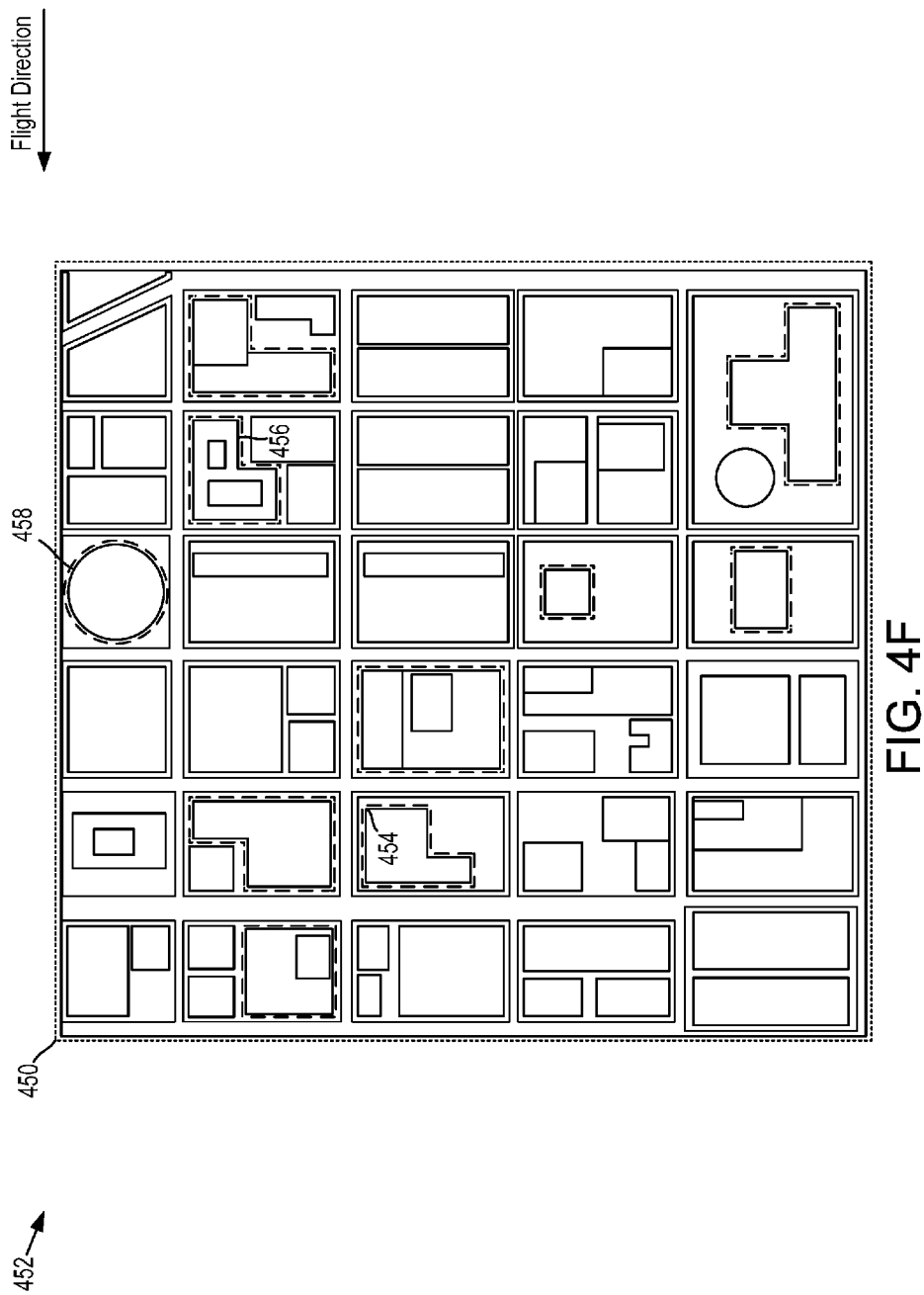
FIG. 4F is another image captured by an unmanned aerial vehicle, according to an example implementation.

FIG. 4F illustrates an image 452 of the area 450, according to an example embodiment. Within examples, the backup navigation system can process the image 452 in order to identify visual features that are located in the area 450. As illustrated in FIG. 4F, processing the image 452 can detect the features 454, 456, and 458, among other features. The backup navigation system can then compare the detected features to the localized features in order to detect a relationship between the detected features and the localized features. For example, the backup navigation system can compare the features 454, 456, and 458 to the localized features 424, 426, and 428 in FIG. 4B and to the localized features 434, 436, 438, 440, and 442 in FIG. 4D.

In an example, the backup navigation system can determine the features 454 and 456 in FIG. 4F are respectively the features 438 and 436 of FIG. 4D. Accordingly, the backup navigation system can determine the location of the features 454 and 456 since the backup navigation system had previously calculated their locations when operating in the feature localization mode. The backup navigation system can then calculate based on the locations of the features 454 and 456 the current location of the UAV 300. For instance, the backup navigation system can use triangulation to calculate the position of the UAV 300.

Once the backup navigation system determines the current position of the UAV 300, the backup navigation system can determine at least a portion of the flight path back to the safe zone. For instance, as illustrated in FIG. 4E, the backup navigation system can determine a portion of the return flight path 482. Then once the backup navigation system detects another relationship between a detected visual feature and a localized feature, the system can determine another portion of the return flight path.

The example scenario 400 depicted in FIGS. 4A-4F and the accompanying description herein is for illustrative purposes only and should not be considered limiting. In an implementation, the image capture device 304 may have a different orientation. For instance, if the UAV 300 is flying at a lower altitude (e.g., near the buildings of the city 402), the orientation of the image capture device 304 can be forward-facing in order to capture images of the structures in the city 402. The backup navigation system can then detect features in the city 402 by detecting characteristics of the features. By way of example, the backup navigation system can detect a spire 414 of the building 404 as a characteristic of the building 404. Other example orientations of the image capture device 304 are possible. As such, other example vantage points of the UAV 300's environment are also possible.

In another implementation, the UAV 300 can preload a map before beginning a flight to a destination. For instance, the map can be of the environment of a flight path, where the map includes locations and/or image data of landmarks that are located in the environment of the flight path. The backup navigation system operating in the feature localization mode during the flight can update the map with additional features of the environment that are detected during the flight. Additionally, the map can be used by the UAV to determine a location of the UAV when the backup navigation system is operating in the UAV localization mode. In an example, the UAV 300 can retrieve the map from a local and/or remote server. In another example, a dispatch system can provide the map to the UAV 300 with the instructions to fly to a destination.

In an embodiment, the preloaded map can be a spatial and temporal map. That is, in addition to being associated with an area, the map can also be associated with a time and/or date. Such a map can also be referred to as a "spatio-temporal" map. For instance, the time and/or date can be a time and/or date of the UAV 300's flight to a destination. By way of example, the UAV 300 or the dispatch system can determine temporal characteristics of the UAV's 300 of a destination, and could select a map whose temporal association encompasses the temporal characteristics of the UAV 300's flight. In an example, the map can be associated with a temporal range (e.g., a time and/or date range), and if the flight falls in that time range, could select that map. This is useful because the identifying characteristics of the environment could change depending on the time of the day or date. For example, certain features may not be visible at night, and other features may not be visible during the winter (e.g., due to snowfall or other environmental conditions). Other examples of dynamic features include shadows (which depend on time and date) and colors of natural features (which can depend on the season).

In another implementation, the backup navigation system can detect features in environments other than a city. Such environments can be indoor (e.g., a warehouse) or outdoor environments. In some examples, the UAV 300 can encounter more than one environment during its flight. For instance, a portion of the flight can be over a city, and another portion can be over a countryside area.

Figure 5:
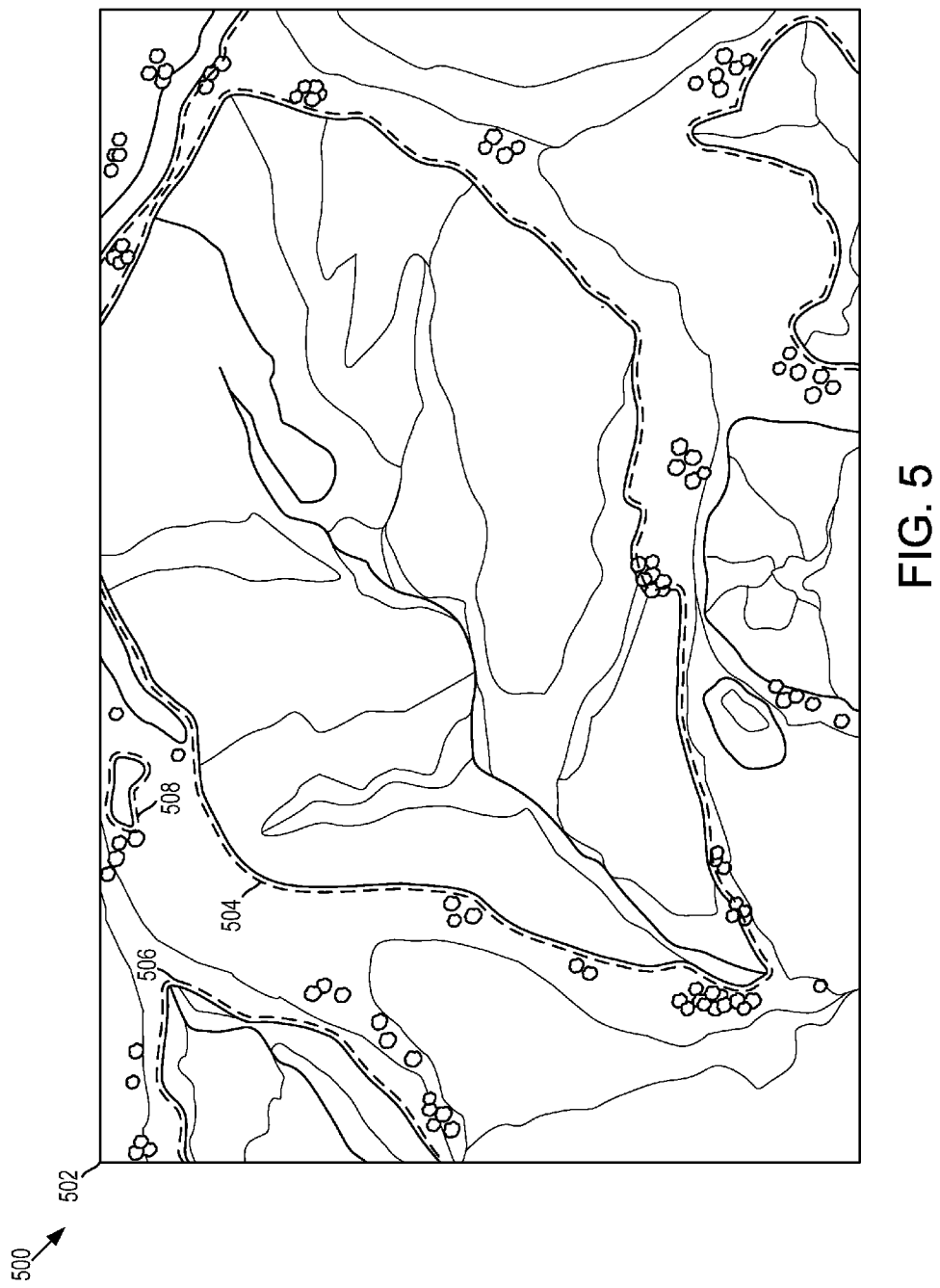
FIG. 5 is an image of a terrain captured by an unmanned aerial vehicle, according to an example implementation.

FIG. 5 illustrates an image 500 of an area 502 that has a hilly or mountainous terrain, according to an exemplary embodiment. In an example, the image 500 is captured by an image capture device of a UAV that is flying over the area 502 en route to a destination. Within examples, the backup navigation system of the UAV can process the image 500 to detect features of the area 502. For example, the backup navigation system can detect features 504 and 506 of the area 502. As illustrated in FIG. 5, the features 504, 506 can be features of the terrain that have unique characteristics. For instance, the characteristics of a hilly terrain feature can be a slope, a ridge, a valley, a hill, a depression, a saddle, a cliff, among other characteristics. As also illustrated in FIG. 5, the backup navigation system can mark the detected features 504, 506 with a dotted line that encompasses the feature. The backup navigation system can then determine the unique characteristics of the features 504, 506 and can use the unique characteristics to generate and/or update a map of the area 502. Similarly, the backup navigation system can detect a water body 508, and can store a location of the water body 508 in a memory of the UAV. Other examples of detected features are possible.

V. Map Database

Also disclosed herein is a system that can generate and/or update a database of maps and/or features that can be used by a UAV for navigation. In an embodiment, the system can include a plurality of UAVs that can be deployed to perform tasks that involve flying to a destination. The system can also include a server that can be responsible for generating and/or updating the maps based on data from the plurality of UAVs. In some examples, the server can be responsible for coordinating the flights of the plurality of UAVs.

In an embodiment, the plurality of UAVs can share their local "feature databases" (i.e., databases of local flights logs and maps) with one another and/or with the server. A UAV or server, upon receiving a database from another UAV, can merge the received database into their respective local database using the same feature matching techniques used by the backup navigation system when operating in the UAV localization mode. In an example, the server can use the databases received from the plurality of UAVs to generate a global map of the areas in which the UAVs are typically deployed. Later, a UAV, before being deployed to perform a task, can preload the global map to the UAV's memory. As explained above, the backup navigation system can use the preloaded global map to replace the navigational functionality of the UAV upon failure of the primary navigation system and/or to check whether the primary navigation system is functioning properly.

In an embodiment, the server can generate and/or update spatio-temporal maps of the environment. A spatio-temporal map is associated with temporal and/or environmental data. In particular, the temporal and/or environmental data can be indicative of temporal data and/or environmental data at the time that the images used to generate the map were captured. The temporal data can include a time and/or date at which the images were captured. For instance, a map can be associated with a time and/or date range. The time range can be on the order of second, minutes, or hours. And the date range can be on the order of days, weeks, months, or years. As for the environmental data, such data can be indicative of meteorological conditions such as the weather of an environment when the image of the environment was captured.

In an embodiment, based on the flight path of a UAV, the server can preload a map that is associated with the flight path. In particular, the map can be associated with an area that the flight path will traverse and at least one of (i) temporal data of the flight path (e.g., time of day of the flight, date of the flight) and (ii) environmental data of the flight (e.g., weather conditions of the area that the flight path will traverse).

In some examples, the UAVs can share with other UAVs or the server the images that they captured during their flight. The captured images can include metadata indicative of geolocation data and data indicative of the status of the UAV and/or the image capture device when the image was captured. For instance, the metadata can include data indicative of the orientation of the image capture device when the image was captured.

In another embodiment, when the backup navigation system of a UAV of the plurality transitions from operating in the feature localization mode to operating in the UAV localization mode, the server can send the UAV a map of the area in which the UAV is located. In an example, the map sent to the UAV can further depend on temporal data and/or environmental data associated with the UAVs flight.

Such a system can allow a UAV, which for various reasons (e.g., fuel considerations), needs to lands in a safe zone in area for which the UAV has not generated a local flight log or map (i.e., the UAV has not traversed the area) to navigate to the safe zone. The system can also allow the UAV to traverse to a new area that the UAV has not traversed to previously.

IV. Illustrative UAV Components

Figure 6:
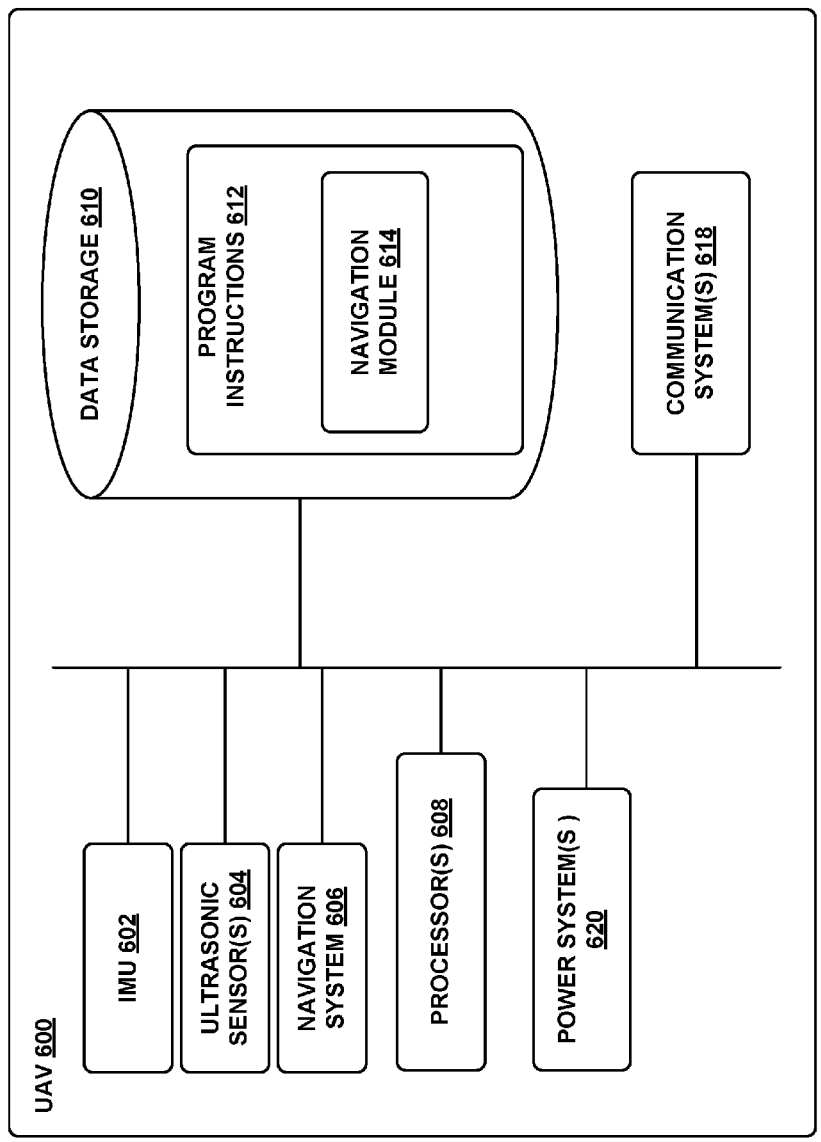
FIG. 6 is a simplified block diagram illustrating components of an unmanned aerial vehicle, according to an example implementation.

FIG. 6 is a simplified block diagram illustrating components of a UAV 600, according to an example implementation. UAV 600 may take the form of, or be similar in form to, one of the UAVs 100, 120, 140, 160, and 180 described in reference to FIGS. 1A-1E.

UAV 600 may include various types of sensors, and may include a computing device configured to provide the functionality described herein. In the illustrated implementation, the sensors of UAV 600 include an inertial measurement unit (IMU) 602, ultrasonic sensor(s) 604, and a navigation system 606, among other possible sensors and sensing systems. In the illustrated implementation, UAV 600 also includes one or more processors 608. A processor 608 may be a general-purpose processor or a special purpose processor (e.g., digital signal processors, application specific integrated circuits, etc.). The one or more processors 608 can be configured to execute computer-readable program instructions 612 that are stored in the data storage 610 and are executable to provide the functionality of a UAV described herein.

The data storage 610 may include or take the form of one or more computer-readable storage media that can be read or accessed by at least one processor 608. The one or more computer-readable storage media can include volatile and/or non-volatile storage components, such as optical, magnetic, organic or other memory or disc storage, which can be integrated in whole or in part with at least one of the one or more processors 608. In some implementations, the data storage 610 can be implemented using a single physical device (e.g., one optical, magnetic, organic or other memory or disc storage unit), while in other implementations, the data storage 610 can be implemented using two or more physical devices.

As noted, the data storage 610 can include computer-readable program instructions 612 and perhaps additional data, such as diagnostic data of the UAV 600. As such, the data storage 610 may include program instructions 612 to perform or facilitate some or all of the UAV functionality described herein. For instance, in the illustrated implementation, program instructions 612 include a navigation module 614.

A. Sensors

In an illustrative implementation, IMU 602 may include both an accelerometer and a gyroscope, which may be used together to determine an orientation of the UAV 600. In particular, the accelerometer can measure the orientation of the vehicle with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. In some implementations, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated implementation, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for UAVs or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some implementations, UAV 600 may also include one or more imaging system(s). For example, one or more still and/or video cameras may be utilized by UAV 600 to capture image data from the UAV's environment. As a specific example, charge-coupled device (CCD) cameras or complementary metal-oxide-semiconductor (CMOS) cameras can be used with UAVs. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 600 may also include a navigation system 606. The navigation system 606 can be configured to provide navigational functionality to the UAV 600. For instance, the navigation system 606 can be a GPS receiver that can be configured to provide data that is typical of well-known GPS systems, such as the GPS coordinates of the UAV 600. Such GPS data may be utilized by the UAV 600 for various functions. As such, the UAV may use its GPS receiver to help navigate to a destination, as indicated, at least in part, by the GPS coordinates of the destination. Other examples are also possible.

A. Navigation and Location Determination

The navigation system 606 can include device (e.g., receivers, sensors, etc.) of the primary navigation system and the backup navigation system. For example, where the primary navigation system is a system that relies on GPS, the navigation system 606 can include a GPS receiver that is configured to receive coordinates from a GPS satellite. Additionally and/or alternatively, the navigation system 606 can include an image capture device that can be configured to capture images of the UAV 600's environment near the UAV 600's flight path.

Further, a navigation module 614 can utilize the devices of the navigation system 606 to provide the UAV 600 with navigational functionality (e.g., allows the UAV 600 to move about its environment and reach a desired location). To navigate the UAV 600, the navigation module 614 can control the altitude and/or direction of flight by controlling the mechanical features of the UAV 600 that affect flight (e.g., its rudder(s), elevator(s), aileron(s), and/or the speed of its propeller(s)). And in order to navigate the UAV 600 to a target location, the navigation module 614 can implement various navigation techniques, such as map-based navigation, for instance. For instance, in conjunction with coordinate data received from the primary navigation system of the navigation system 606, the UAV 600 can use a map of its environment, which can then be used to navigate to a particular location on the map.

In some implementations, the navigation module 614 can navigate using a technique that relies on waypoints. In particular, waypoints are sets of coordinates that identify points in physical space. For instance, an air-navigation waypoint may be defined by a certain latitude, longitude, and altitude. Accordingly, the navigation module 614 can cause UAV 600 to move from waypoint to waypoint, in order to ultimately travel to a final destination (e.g., a final waypoint in a sequence of waypoints).

In a further aspect, the navigation module 614 and/or other components and systems of the UAV 600 may be configured for "localization" to more precisely navigate to the scene of a target location. More specifically, it can be desirable in certain situations for the UAV 600 to be within a threshold distance of the target location where a payload 628 is being delivered by the UAV 600 (e.g., within a few feet of the target destination). To this end, the UAV 600 can use a two-tiered approach in which it uses a more-general location-determination technique to navigate to a general area that is associated with the target location, and then use a more-refined location-determination technique to identify and/or navigate to the target location within the general area.

For example, the UAV 600 can navigate to the general area of a target destination where a payload 628 is being delivered using waypoints and/or map-based navigation. The UAV 600 can then switch to a mode in which it utilizes a localization process to locate and travel to a more specific location. For instance, if the UAV 600 is to deliver a payload to a user's home, the UAV 600 may need to be substantially close to the target location in order to avoid delivery of the payload to undesired areas (e.g., onto a roof, into a pool, onto a neighbor's property, etc.). However, a GPS signal can only get the UAV 600 so far (e.g., within a block of the user's home). A more precise location-determination technique can then be used to find the specific target location.

Various types of location-determination techniques can be used to accomplish localization of the target delivery location once the UAV 600 has navigated to the general area of the target delivery location. For instance, the UAV 600 can be equipped with one or more sensory systems, such as, for example, ultrasonic sensors 604, infrared sensors (not shown), and/or other sensors, which can provide input that the navigation module 614 utilizes to navigate autonomously or semi-autonomously to the specific target location.

As another example, once the UAV 600 reaches the general area of the target delivery location (or of a moving subject such as a person or their mobile device), the UAV 600 can switch to a "fly-by-wire" mode where it is controlled, at least in part, by a remote operator, who can navigate the UAV 600 to the specific target location. To this end, sensory data from the UAV 600 can be sent to the remote operator to assist them in navigating the UAV 600 to the specific location.

As yet another example, the UAV 600 may include a module that is able to signal to a passer-by for assistance in reaching the specific target delivery location. For example, the UAV 600 may display a visual message requesting such assistance in a graphic display, with the visual message possibly indicating the specific target delivery location, among other possibilities. In another example, the UAV 600 can play an audio message or tone through speakers to indicate the need for such assistance, with the audio message or tone possibly indicating the specific target delivery location, among other possibilities. In practice, such a feature can be useful in a scenario in which the UAV is unable to use sensory functions or another location-determination technique to reach the specific target location. However, this feature is not limited to such scenarios.

In some implementations, once the UAV 600 arrives at the general area of a target delivery location, the UAV 600 may utilize a beacon from a user's remote device (e.g., the user's mobile phone) to locate the remote device, person, or location. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 600 may be configured to navigate by "sourcing" such directional signals—in other words, by determining where the signal is strongest and navigating accordingly. As another example, a mobile device can emit a frequency, either in the human range or outside the human range, and the UAV 600 can listen for that frequency and navigate accordingly. As a related example, if the UAV 600 is listening for spoken commands, then the UAV 600 could utilize spoken statements, such as "I'm over here!" to source the specific location of the person requesting delivery of a payload.

In an alternative arrangement, a navigation module may be implemented at a remote computing device, which communicates wirelessly with the UAV 600. The remote computing device may receive data indicating the operational state of the UAV 600, sensor data from the UAV 600 that allows it to assess the environmental conditions being experienced by the UAV 600, and/or location information for the UAV 600. Provided with such information, the remote computing device may determine latitudinal and/or directional adjustments that should be made by the UAV 600 and/or may determine how the UAV 600 should adjust its mechanical features (e.g., its rudder(s), elevator(s), aileron(s), and/or the speed of its propeller(s)) in order to effectuate such movements. The remote computing device may then communicate such adjustments to the UAV 600 so it can move in the determined manner.

B. Communication Systems

In a further aspect, the UAV 600 can include one or more communication systems 618. In some examples, the UAV 600 does not include the communication systems 618. In other examples, the UAV 600 can function without the communication system 618 if for some reason the communication systems 618 were rendered inoperable. Within examples, the communications systems 618 may include one or more wireless interfaces and/or one or more wireline interfaces, which allow the UAV 600 to communicate via one or more networks. Such wireless interfaces may provide for communication under one or more wireless communication protocols, such as Bluetooth, WiFi (e.g., an IEEE 902.11 protocol), Long-Term Evolution (LTE), WiMAX (e.g., an IEEE 902.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some implementations, a UAV 600 may include communication systems 618 that allow for both short-range communication and long-range communication. For example, the UAV 600 may be configured for short-range communications using Bluetooth and for long-range communications under a CDMA protocol. In such an implementation, the UAV 600 may be configured to function as a "hot spot;" or in other words, as a gateway or proxy between a remote support device and one or more data networks, such as a cellular network and/or the Internet. Configured as such, the UAV 600 may facilitate data communications that the remote support device would otherwise be unable to perform by itself.

For example, the UAV 600 may provide a WiFi connection to a remote device, and serve as a proxy or gateway to a cellular service provider's data network, which the UAV might connect to under an LTE or a 3G protocol, for instance. The UAV 600 could also serve as a proxy or gateway to a high-altitude balloon network, a satellite network, or a combination of these networks, among others, which a remote device might not be able to otherwise access.

C. Power Systems

In a further aspect, the UAV 600 may include power system(s) 620. The power system 620 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

VI. Example Server

Figure 7:
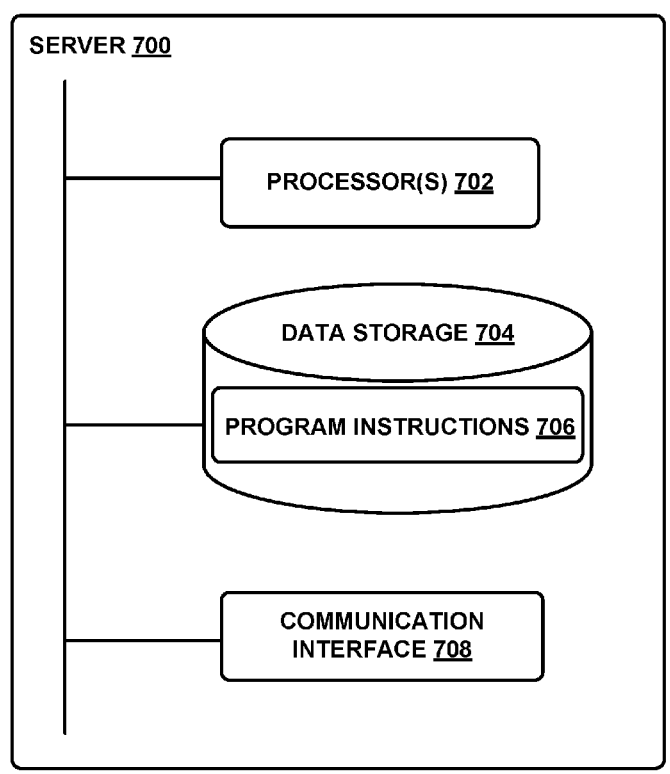
FIG. 7 illustrates a schematic diagram of a server, according to an example implementation.

FIG. 7 illustrates a schematic diagram of a server 700, according to an example implementation. The server 700 includes one or more processor(s) 702 and data storage 704, such as a non-transitory computer readable medium. Additionally, the data storage 704 is shown as storing program instruction 706, which may be executable by the processor(s) 702. Further, the server 700 also includes a communication interface 708. Note that the various components of server 700 may be arranged and connected in any manner.

Moreover, the above description of processor(s) 702, data storage 704, and communication interface 708, may apply to any discussion relating to the respective component being used in another system or arrangements. For instance, as noted, FIG. 7 illustrates processors, data storage, and a communication interface as being incorporated in another arrangement. These components at issue may thus take on the same or similar characteristics (and/or form) as the respective components discussed above in association with FIG. 7. However, the components at issue could also take on other characteristics (and/or form) without departing from the scope of the disclosure.

In practice, a server may be any program and/or device that provides functionality for other programs and/or devices (e.g., any of the above-described devices), which could be referred to as "clients". Generally, this arrangement may be referred to as a client-server model. With this arrangement, a server can provides various services, such as data and/or resource sharing with a client and/or carrying out computations for a client, among others. Moreover, a single server can provide services for one or more clients and a single client can receive services from one or more servers. As such, servers could take various forms (currently known or developed in the future), such as a database server, a file server, a web server, and/or an application server, among other possibilities.

Generally, a client and a server may interact with one another in various ways. In particular, a client may send a request or an instruction or the like to the server. Based on that request or instruction, the server may perform one or more operations and may then respond to the client with a result or with an acknowledgement or the like. In some cases, a server may send a request or an instruction or the like to the client. Based on that request or instruction, the client may perform one or more operations and may then respond to the server with a result or with an acknowledgement or the like. In either case, such communications between a client and a server may occur via a wired connection or via a wireless connection, such as via a network for instance.

VII. Illustrative Methods

Figure 8:
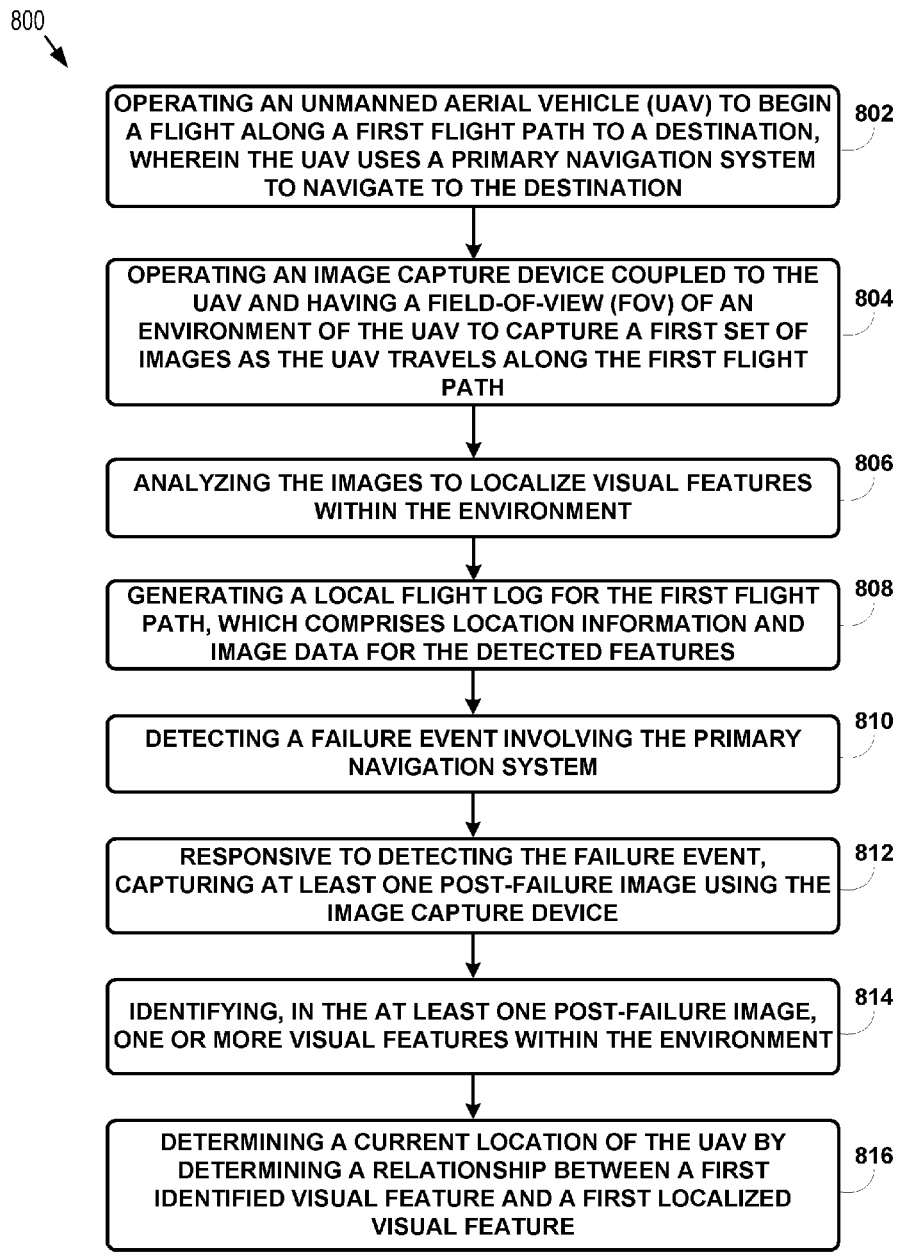
FIG. 8 illustrates an example flowchart, according to an example implementation.

FIG. 8 is a flowchart of method 800, in accordance with an example embodiment. Method 800 can be carried out by a UAV, such as the UAV 600 illustrated in FIG. 6. In particular, the UAV 600 or a controller thereof can execute software to carry out method 800. Additionally and/or alternatively, the method 800 can be carried out by a dispatch system, such as local dispatch system 212 or central dispatch system 210 of FIG. 2.

Method 800 can begin at block 802, where the method 800 involves operating an unmanned aerial vehicle (UAV) to begin a flight along a first flight path to a destination, where the UAV uses a primary navigation system to navigate to the destination, such as discussed above in the context of at least FIGS. 4A-4F and FIG. 6. For example, the UAV can be any of the UAVs illustrated in FIGS. 1A-1E, 3, and 4A-4F. As also discussed elsewhere herein, the primary navigation system can be a system that relies on GPS, and therefore, the system can include a GPS receiver.

As illustrated at block 804, the method 800 further involves operating an image capture device coupled to the UAV and having a field-of-view (FOV) of an environment of the UAV to capture a first set of images as the UAV travels along the first flight path. As explained elsewhere herein, in an embodiment, the image capture device can be a camera that has a 90 degree FOV. Further, the image capture device can be configured to periodically capture images of the UAV's environment as the UAV traverses a determined flight path to the destination.

As illustrated at block 806, the method 800 further involves analyzing the images to localize visual features within the environment. Analyzing the images can involve using feature detection algorithms to identify or detect features in the image. Then the detected features could be localized, which involves determining a location of the detected features in the environment.

As illustrated at block 808, the method 800 further involves generating a local flight log for the first flight path, which comprises location information and image data for the detected features. The flight log or map can include location information associated with one or more features that are detected during the UAV's flight. Additionally and/or alternatively, the flight log can include image data that can be used to identify the feature. In an example, the image data can be a captured image of the feature. Additionally and/or alternatively, the image data can include identifying characteristics that can be used to identify the feature. For instance, the identifying characteristics can be a design characteristics of the feature, shape and dimensions of the feature, and/or aesthetic characteristics of the feature. Therefore, the map can be used to identify a particular feature, and once the feature is identified, a location of the feature can be determined.

As illustrated at block 810, the method 800 involves detecting a failure event involving the primary navigation system. As explained above, the failure event can be any event that can affect the operability of the primary navigation system, such as a receiver malfunction, a loss of satellite signal, among other examples.

As illustrated at block 812, the method 800 further involves responsive to detecting the failure event, capturing at least one post-failure image using the image capture device. That is, responsive to detecting the failure event, the image capture device can capture an image of the UAV's environment, e.g., as part of operating in the UAV localization mode.

As illustrated at block 814, the method 800 further involves identifying, in the at least one post-failure image, one or more visual features within the environment. In line with the discussion above, the backup navigation system can process the post-failure image in order to detect features of the environment that were captured in the image. In an example, the backup navigation system can compare the features extracted from the post-failure image to localized features that are stored locally in a memory of the UAV. The localized features can be features that the backup navigation system localized when operating in the feature localization mode or can be features that have a known location in the map (e.g., a landmark). In some examples, the system can identify the feature (e.g., a landmark) but may not have location information of the feature.

As illustrated at block 816, the method further involves determining a current location of the UAV by determining a relationship between a first identified visual feature and a first localized visual feature. In an example, the relationship between the first identified visual feature and the first localized feature can be one of correspondence. For instance, the system can determine that the first identified visual feature was previously localized, and therefore, the system can detect that the first identified visual feature matches or is identical to the first localized feature. Other relationships between an identified and a localized feature are possible. In an example, the backup navigation system can match at least one of the identified or extracted features to at least one of the localized features. Then, the system can use the known location of the at least one localized feature to calculate the location of the UAV, e.g., by using a triangulation algorithm.

Figure 9:
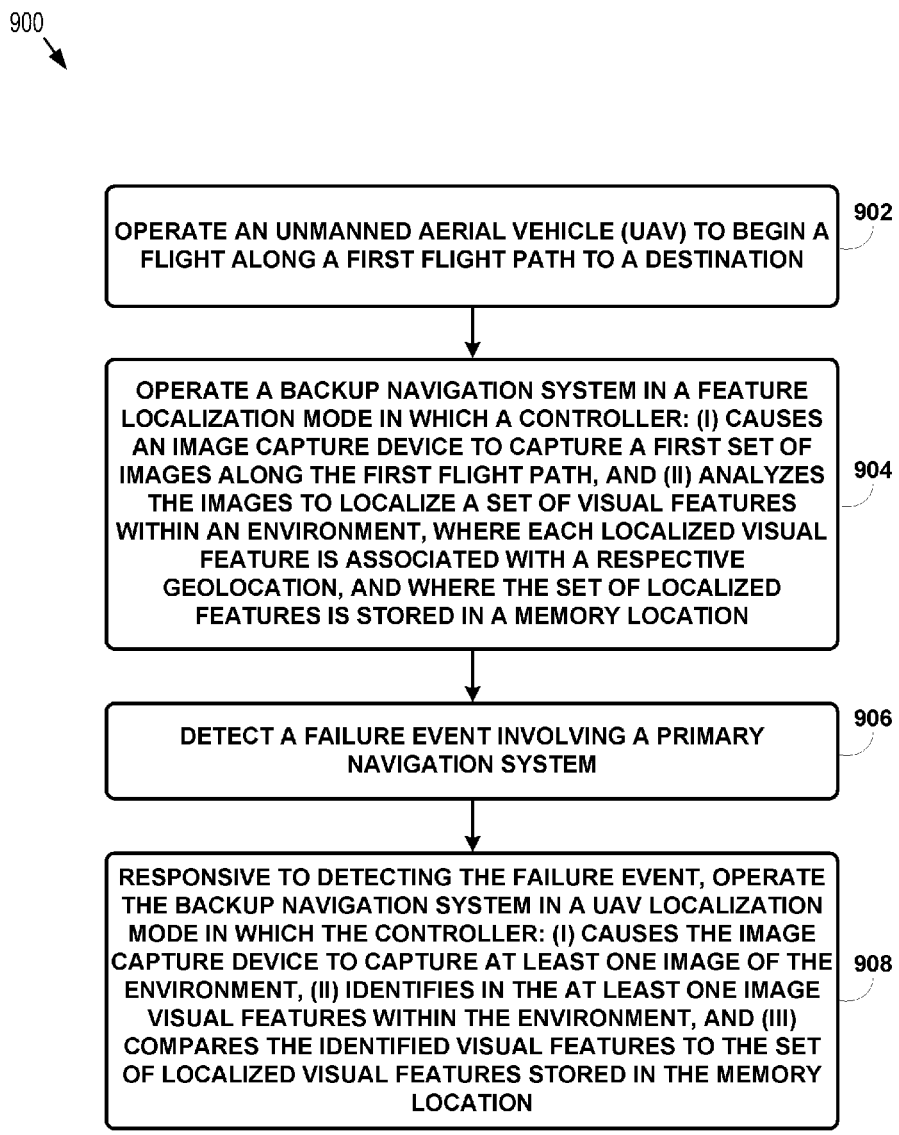
FIG. 9 illustrates another example flowchart, according to an example implementation.

FIG. 9 is a flowchart of method 900, in accordance with an example embodiment. Method 900 can be carried out by a UAV, such as the UAV 600 illustrated in FIG. 6. In particular, the UAV 600 or a controller thereof can execute software to carry out method 900. Additionally and/or alternatively, the method 900 can be carried out by a dispatch system, such as local dispatch system 212 or central dispatch system 210 of FIG. 2.

Method 900 can begin at block 902, where the method 900 involves a controller of a UAV configured to operate the UAV to begin a flight along a first flight path to a destination. As explained herein, the first flight path can be determined by the primary navigation system before the UAV begins the flight. Additionally, the primary navigation system can be responsible for providing the controller with navigational updates that allow the controller to navigate the UAV.

As illustrated at block 904, the method 900 can further involve the controller configured to operate a backup navigation system in a feature localization mode in which the controller: (i) causes an image capture device to capture a first set of images along the first flight path, and (ii) analyzes the images to localize a set of visual features within an environment, where each localized visual feature is associated with a respective geolocation, and where the set of localized features is stored in a memory location. Within examples, a geolocation can be any type of identification or estimation of the real-world geographic location of a feature.

As illustrated at block 906, the method 900 can further involve the controller configured to detect a failure event involving a primary navigation system of the UAV.

As illustrated at block 908, the method 900 can further involve the controller configured to, responsive to detecting the failure event, operate the backup navigation system in a UAV localization mode in which the controller: (i) causes the image capture device to capture at least one image of the environment, (ii) identifies in the at least one image visual features within the environment, and (iii) compares the identified visual features to the set of localized visual features stored in the memory location.

Figure 10:
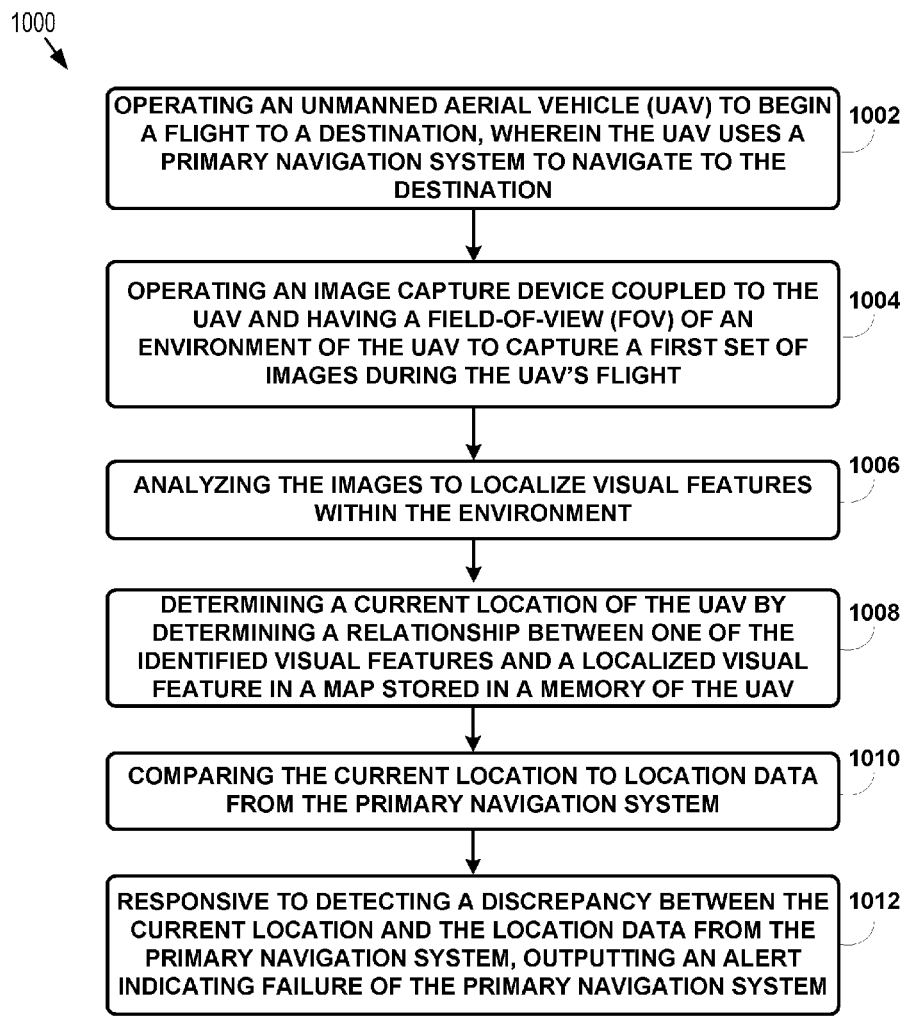
FIG. 10 illustrates another example flowchart, according to an example implementation.

FIG. 10 is a flowchart of method 1000, in accordance with an example embodiment. Method 1000 can be carried out by a UAV, such as the UAV 600 illustrated in FIG. 6. In particular, the UAV 600 or a controller thereof can execute software to carry out method 1000. Additionally and/or alternatively, the method 1000 can be carried out by a server (e.g., dispatch system), such as local dispatch system 212 or central dispatch system 210 of FIG. 2.

Method 1000 can begin at block 1002, where the method 1000 involves operating an unmanned aerial vehicle (UAV) to begin a flight to a destination, where the UAV uses a primary navigation system to navigate to the destination.

As illustrated at block 1004, the method 1000 can further include operating an image capture device coupled to the UAV and having a field-of-view (FOV) of an environment of the UAV to capture a first set of images during the UAV's flight. As described herein, the image capture device may be part of a backup navigation system of the UAV.

As illustrated at block 1006, the method 1000 can further include analyzing the images to identify visual features within the environment. This step involves the backup navigation system operating in the "feature localization mode" to localize features in the environment.

As illustrated at block 1008, the method 1000 can further include determining a current location of the UAV by determining a relationship between one of the identified visual features and a localized visual feature in a map stored in a memory of the UAV. This step involves the backup navigation system operating in the "UAV localization mode" to determine a current location of the UAV. For instance, the backup navigation system can periodically operate in the UAV localization mode in order to determine a location of the UAV. As explained above, the system can use a map (e.g., a locally generated or preloaded map) to determine a current location of the UAV.

As illustrated at block 1010, the method 1000 can further include comparing the current location to location data from the primary navigation system. At this step, the system can compare the current location of the UAV as determined by the backup navigation system to the current location of the UAV as determined by the primary navigation system.

As illustrated at block 1012, the method 1000 can further include responsive to detecting a discrepancy between the current location and the location data from the primary navigation system, outputting an alert indicating failure of the primary navigation system. For example, the system can determine that the discrepancy between the UAV's location as determined by the backup navigation system and the UAV's location as determined by the primary navigation system is greater than a threshold, e.g., a predetermined threshold. If so, the system can determine that the primary navigation system may have encountered a failure event or may have been spoofed and is outputting incorrect data as a result. Thus, responsive to detecting the discrepancy greater than the threshold, the system can output an alert indicating failure of the primary navigation system. Additionally and/ or alternatively, the backup navigation system can override to the primary navigation system to navigate the UAV. As such, the backup navigation system can also function to continually or periodically check the integrity of the primary navigation system.

VIII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Further, in the context of the present disclosure, data could be treated to ensure privacy when the data might include (without limitation) information related to: an individual's identity, and individual's location, an individual's order history, a UAV's identity, a UAV's location, a UAV's flight history, a business's identity, a business's location, and/or a business's order history, among others.

Accordingly, in situations in which system(s) collect and/or make use of information about entities (e.g., individuals, UAVs, and/or businesses), data may be treated in one or more ways before it is stored or used, so that personally identifiable information is removed or otherwise cannot be discovered by an unauthorized entity/system.

In one example, an entity's identity and/or geographic location may be treated so that no personally identifiable information can be determined for the entity. To do so, a system may transmit and/or receive data in the form of anonymized data streams. That is, data representing information related to one or more entities may not provide any information related to respective identities and/or locations of the one or more entities, thereby maintaining privacy.

In another example, when data is set to include information related to an entity's identity and/or location, the data could be arranged so that this information is specified in such a way that only an authorized entity/system could ascertain a particular identify and/or a particular location of an entity. To do so, a system may transmit and/or receive data in the form of coded data streams in which the information takes the form a code interpretable only by an authorized entity/system.

In yet another example, data representing information related to an entity's identity and/or location may be encrypted so that only an authorized entity/system could obtain access to the information. For instance, an authorized entity/system could obtain access to the information only through use of a previously-obtained security key that enables access to the information.

In yet another example, data representing information related to an entity's identity and/or location may only be available temporarily. For instance, a system could be configured to store such data for a certain time period and to then permanently delete the data upon detecting expiration of this time period. Other examples are possible as well.

We claim:

1. A method comprising:
  operating an unmanned aerial vehicle (UAV) to begin a flight along a first flight path to a destination, wherein the UAV uses a primary navigation system to navigate to the destination;
  operating an image capture device coupled to the UAV and having a field-of-view (FOV) of an environment of the UAV to capture a first set of images as the UAV travels along the first flight path;
  analyzing the images to localize visual features within the environment;
  generating a local flight log for the first flight path, wherein the local flight log comprises location information and image data for the detected features;
  detecting a failure event involving the primary navigation system;
  responsive to detecting the failure event, capturing at least one post-failure image using the image capture device;
  identifying, in the at least one post-failure image, one or more visual features within the environment; and
  detecting a match between a first of the identified visual features and a first of the localized visual features, and responsively:
    determining, based at least in part on (i) location information for the first localized visual feature indicated by the local flight log, and (ii) an orientation of the UAV corresponding to the capture of the post-failure image, a current location of the UAV.

2. The method of claim 1, wherein the image capture device is part of a backup navigation system of the UAV, and wherein the backup navigation system replaces navigational functionality of the primary navigation system upon detecting the failure event.

3. The method of claim 1, wherein the primary navigation system is reliant upon a global positioning system (GPS).

4. The method of claim 1, further comprising:
  responsive to detecting the failure event, determining to fly the UAV to a safe zone; and
  based on the current location of the UAV, determining at least a portion of a second flight path to the safe zone.

5. The method of claim 4, wherein the first flight path and the second flight path are the same flight path.

6. The method of claim 4, wherein the UAV is deployed from a home base to the destination, and wherein the safe zone is the home base of the UAV.

7. The method of claim 4, wherein the second flight path has a substantially similar altitude to the first flight path such that the image capture device during the second flight path has a substantially similar FOV of the environment to the FOV of the environment that the image capture device has during the first flight path.

8. The method of claim 1, wherein operating the image capture device to capture the first set of images along the flight path comprises:
  using position data from the primary navigation system to associate each image with a respective geolocation.

9. The method of claim 1, wherein analyzing the images to localize visual features within the environment comprises:
  analyzing the first set of images to identify visual features in the images;
  comparing a first visual feature identified in a first image to visual features identified in other images of the first set of images;
  detecting a match between the first visual feature and a corresponding visual feature of a second image; and
  determining a location of the first visual feature.

10. The method of claim 9, wherein determining the location of the first visual feature comprises:

executing an algorithm using a first geolocation of the first image and a second geolocation of the second image to determine the location of the first visual feature.

11. The method of claim 10, wherein the algorithm is a triangulation algorithm.

12. The method of claim 1, wherein operating the UAV to begin a flight further comprises:
- determining a time of the flight and environmental conditions along the first flight path;
- selecting a map associated with at least one of the time of the flight and the environmental conditions, wherein the map is representative of at least an area along the first flight path; and
- loading the map to a memory of the UAV before the UAV begins the flight.

13. The method of claim 1, wherein determining the current location of the UAV further comprises:
- matching the first identified visual feature and a second identified visual feature to the first localized visual feature and a second localized visual feature;
- based on coordinates of the first and second localized visual features, determining coordinates of the first and second visual features; and
- using the coordinates of the first and second visual features as a basis for determining the current location of the UAV.

14. An unmanned aerial vehicle (UAV) comprising:
- a primary navigation system that provides the UAV with navigational functionality;
- a backup navigation system configured to replace the navigational functionality of the primary navigation system upon detecting a failure event involving the primary navigation system;
- wherein the backup navigation system comprises an image capture device configured to capture images of an environment of the UAV and a controller,
- wherein the controller is configured to:
  - operate the UAV to begin a flight along a first flight path to a destination;
  - operate the backup navigation system in a feature localization mode in which the controller: (i) causes the image capture device to capture a first set of images along the first flight path, and (ii) analyzes the images to localize a set of visual features within the environment, wherein each localized visual feature is associated with a respective geolocation, and wherein the set of localized features is stored in a memory location;
  - detect a failure event involving the primary navigation system;
  - responsive to detecting the failure event, operate the backup navigation system in a UAV localization mode in which the controller: (i) causes the image capture device to capture at least one post-failure image of the environment, (ii) identifies in the at least one post-failure image visual features within the environment, and (iii) compares the identified visual features to the set of localized visual features stored in the memory location; and
  - detect a match between a first of the identified visual features and a first of the localized visual features, and responsively determine, based at least in part on (i) location information for the first localized visual feature indicated by the local flight log, and (ii) an orientation of the UAV corresponding to the capture of the post-failure image, a current location of the UAV.

15. The UAV of claim 14, wherein the controller is further configured to:
- responsive to detecting the failure event, determine to fly the UAV to a safe zone; and
- based on the current location of the UAV, determine at least a portion of a second flight path to the safe zone.

16. The UAV of claim 14, wherein the primary navigation system comprises a global positioning system (GPS) device configured to receive a satellite signal, and wherein the failure event is at least one of: (i) a malfunction of the GPS device, and (ii) a loss of the satellite signal.

* * * * *